(12) United States Patent
Dooley et al.

(10) Patent No.: US 9,308,643 B2
(45) Date of Patent: Apr. 12, 2016

(54) TRANSFERABLE INTELLIGENT CONTROL DEVICE

(71) Applicant: iRobot Corporation, Bedford, MA (US)

(72) Inventors: Michael Dooley, Pasadena, CA (US); Nikolai Romanov, Oak Park, CA (US); Paolo Pirjanian, Glendale, CA (US)

(73) Assignee: iRobot Corporation, Bedford, MA (US)

( * ) Notice: Subject to any disclaimer, the term of this patent is extended or adjusted under 35 U.S.C. 154(b) by 35 days.

(21) Appl. No.: 14/255,880

(22) Filed: Apr. 17, 2014

(65) Prior Publication Data

US 2014/0229004 A1 Aug. 14, 2014

Related U.S. Application Data

(63) Continuation of application No. 12/234,543, filed on Sep. 19, 2008, now abandoned.

(60) Provisional application No. 60/994,651, filed on Sep. 20, 2007.

(51) Int. Cl.
*B25J 9/00* (2006.01)
*B25J 9/16* (2006.01)
*G06N 3/00* (2006.01)

(52) U.S. Cl.
CPC .............. *B25J 9/0084* (2013.01); *B25J 9/1658* (2013.01); *G06N 3/004* (2013.01); *G05B 2219/40304* (2013.01); *G05B 2219/40306* (2013.01); *G05B 2219/40397* (2013.01)

(58) Field of Classification Search
CPC ...... B25J 9/0084; B25J 9/1658; B25J 9/0081; B25J 9/1656–9/1674; B25J 9/1679; B25J 9/1684; B25J 9/1689; G06N 3/004; G05B 19/42; G05B 19/421–19/427; G05B 2219/39146; G05B 2219/39168; G05B 2219/40403; G05B 2219/403; G05B 2219/40397; G05B 2219/40306; A47L 2201/00; A47L 2201/04–2201/06; G05D 1/00; G05D 1/0011–1/0016; G05D 1/0027; G05D 1/0044; G05D 2201/0215; Y10S 901/01; Y10S 901/46–901/47; Y10S 901/50; A63F 2250/52; A63F 2009/2401; A63F 2009/2448–2009/245

USPC ............... 700/246–250, 253, 258–259; 701/23–28; 901/1, 46–47, 50; 318/568.12–568.16, 568.2
See application file for complete search history.

(56) References Cited

U.S. PATENT DOCUMENTS

| 4,586,151 A | 4/1986 | Buote |
| 4,815,840 A | 3/1989 | Benayad-Cherif et al. |

(Continued)

FOREIGN PATENT DOCUMENTS

| EP | 1 327 503 A1 | 7/2003 |
| GB | 2 390 450 A | 1/2004 |

(Continued)

OTHER PUBLICATIONS

Evolution Robotics: Chapter 1 Introduction, "ERSP 3.0: Getting Started Guide for Linux." Mar. 15, 2004, pp. 1-9.

(Continued)

*Primary Examiner* — Bao Long T Nguyen
(74) *Attorney, Agent, or Firm* — Knobbe, Martens, Olson & Bear LLP

(57) ABSTRACT

An integrated intelligent system includes a first intelligent electronic device, a second intelligent electronic device, a transferable intelligent control device (TICD) and a cross product bus. The first intelligent electronic device performs a first function and the second intelligent electronic device performs a second function. The cross product bus couples the first intelligent electronic device to the transferable intelligent control device. The TICD partially controls behaviors of the intelligent electronic device by sending commands over the cross product bus to the first intelligent electronic device and the TICD partially controls behaviors of the second intelligent electronic device to perform the second function. The TICD is first attached to the first intelligent electronic device to partially control the behaviors of the first electronic device, then detached from the first electronic device, and then attached to the second intelligent electronic device to perform the second function.

24 Claims, 6 Drawing Sheets

(56) References Cited

U.S. PATENT DOCUMENTS

| | | | |
|---|---|---|---|
| 4,962,338 | A | 10/1990 | Daggett et al. |
| 5,825,981 | A | 10/1998 | Matsuda |
| 5,963,712 | A | 10/1999 | Fujita et al. |
| 5,983,200 | A | 11/1999 | Slotznick |
| 6,073,054 | A | 6/2000 | Katayama et al. |
| 6,321,140 | B1 | 11/2001 | Fujita et al. |
| 6,442,451 | B1 | 8/2002 | Lapham |
| 6,526,332 | B2 | 2/2003 | Sakamoto et al. |
| 6,591,165 | B2 | 7/2003 | Takamura |
| 6,629,028 | B2 | 9/2003 | Paromtchik et al. |
| 6,687,571 | B1 | 2/2004 | Byrne et al. |
| 6,760,648 | B2 | 7/2004 | Sakamoto et al. |
| 6,813,753 | B2 | 11/2004 | Jones |
| 6,816,753 | B2 | 11/2004 | Sakamoto et al. |
| 6,842,674 | B2 | 1/2005 | Solomon |
| 6,889,118 | B2 | 5/2005 | Murray, IV et al. |
| 7,076,336 | B2 | 7/2006 | Murray, IV et al. |
| 7,162,056 | B2 | 1/2007 | Burl et al. |
| 7,222,349 | B1 | 5/2007 | Krinke, II et al. |
| 7,302,312 | B2 | 11/2007 | Murray, IV et al. |
| 7,328,196 | B2 | 2/2008 | Peters, II |
| 7,409,266 | B2 | 8/2008 | Hara et al. |
| 7,742,845 | B2 | 6/2010 | Fink et al. |
| 7,765,038 | B2* | 7/2010 | Appleby et al. ............... 701/23 |
| 2003/0139850 | A1 | 7/2003 | Sakamoto et al. |
| 2003/0212472 | A1* | 11/2003 | McKee .................. 700/245 |
| 2004/0162638 | A1* | 8/2004 | Solomon ................. 700/247 |
| 2004/0168148 | A1 | 8/2004 | Goncalves et al. |
| 2005/0007057 | A1 | 1/2005 | Peless et al. |
| 2005/0010330 | A1 | 1/2005 | Abramson et al. |
| 2005/0021186 | A1 | 1/2005 | Murray et al. |
| 2005/0200325 | A1* | 9/2005 | Kim et al. ............... 318/568.12 |
| 2005/0213082 | A1 | 9/2005 | DiBernardo et al. |
| 2005/0234592 | A1 | 10/2005 | McGee et al. |
| 2005/0289527 | A1 | 12/2005 | Illowsky et al. |
| 2006/0095169 | A1 | 5/2006 | Minor et al. |
| 2006/0117324 | A1 | 6/2006 | Alsafadi et al. |
| 2006/0241811 | A1 | 10/2006 | Brown et al. |
| 2007/0050088 | A1 | 3/2007 | Murray, IV et al. |
| 2007/0093940 | A1 | 4/2007 | Ng-Thow-Hing et al. |
| 2007/0097832 | A1 | 5/2007 | Koivisto et al. |
| 2007/0156286 | A1 | 7/2007 | Yamauchi |
| 2007/0179670 | A1 | 8/2007 | Chiappetta et al. |
| 2007/0208442 | A1 | 9/2007 | Perrone |
| 2007/0219666 | A1 | 9/2007 | Filippov et al. |
| 2007/0219720 | A1 | 9/2007 | Trepagnier et al. |
| 2007/0244610 | A1 | 10/2007 | Ozick et al. |
| 2007/0271011 | A1 | 11/2007 | Lee et al. |
| 2008/0005255 | A1 | 1/2008 | Fernando et al. |
| 2008/0009965 | A1 | 1/2008 | Bruemmer et al. |
| 2008/0009966 | A1 | 1/2008 | Bruemmer et al. |
| 2008/0009967 | A1 | 1/2008 | Bruemmer |
| 2008/0009968 | A1 | 1/2008 | Bruemmer et al. |
| 2008/0009969 | A1 | 1/2008 | Bruemmer et al. |
| 2008/0012518 | A1 | 1/2008 | Yamamoto |
| 2008/0133052 | A1 | 6/2008 | Jones et al. |
| 2009/0081923 | A1 | 3/2009 | Dooley et al. |

FOREIGN PATENT DOCUMENTS

| | | |
|---|---|---|
| WO | WO 2005/109299 A1 | 11/2005 |
| WO | WO 2007/041390 A2 | 4/2007 |

OTHER PUBLICATIONS

IMACS Multiconference on Computational Engineering in Systems Applications, "A Flexible Software Architecture for Multi-Modal Service Robots," Baier et al., Oct. 4, 2006, pp. 587-592.

International Search Report dated Oct. 30, 2009 for International Application No. PCT/US2008/010910, filed Sep. 19, 2008, 4 pages.

Journal of Robotics and Mechatronics, "Device Distributed Approach to Expandable Robot System Using Intelligent Device with Super-Microprocessor,"•Okada et al., 2004, vol. 16, No. 2, pp. 208-216.

Proceedings of the 16th Annual AIAA/USU Conference on Small Satellites. "A Distributed Computing Architecture for Small Satellite and Multi-Spacecraft Missions," Palmintier et al., Aug. 13, 2002, pp. 1-11.

Proceedings of the 2004 IEEE International Conference on Robotics & Automation, Design and Implementation of an Open Autonomous Mobile Robot System, Jia et al., Apr. 26, 2004, vol. 2, abstract, section 11, pp. 1726-1731.

Proceedings of the 2006 Sice-Icase International Joint Conference, "The Robot Software Communications Architecture (RSCA): QoS-Aware Middleware for Networked Service Robots," Yoo et al., Oct. 18, 2006, pp. 330-335.

\* cited by examiner

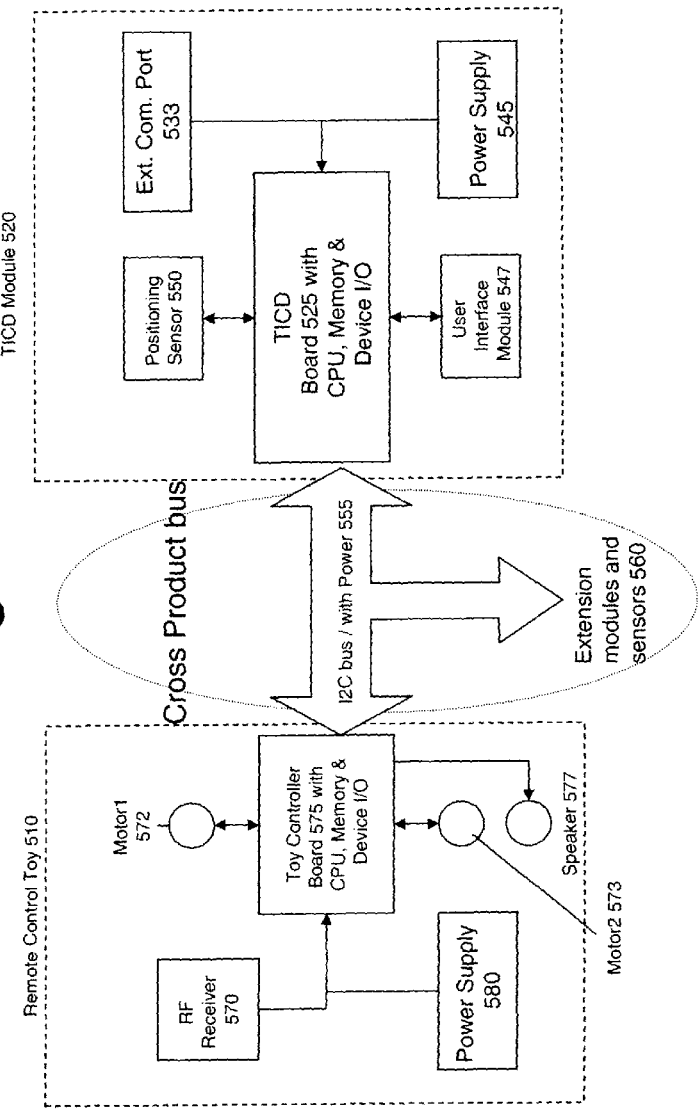

TRANSFERABLE INTELLIGENT CONTROL DEVICE

CROSS-REFERENCE TO RELATED APPLICATIONS

This is a continuation of U.S. patent application Ser. No. 12/234,543, filed Sep. 19, 2008, which claims priority to provisional patent application Ser. No. 60/994,651, filed Sep. 20, 2007, the contents of which are incorporated herein by reference in their entirety.

BACKGROUND OF THE INVENTION

Currently, it is costly to develop and manufacture robotic devices. Each robotic device requires costly control electronics and sensors in order to operate within its environment. In addition, software has to be developed to take input from the sensors and drive the control electronics for the robotic device. This is in addition to the cost of developing device specific functionalities for the robotic device's intended use. For example, with a robotic cleaning device, these device specific functionalities would be the specific cleaning mechanism, a power supply and a mobile platform that is optimized for moving the robotic cleaning mechanism around. The control electronics, sensors and software drive up the cost of the robotic devices for consumers and/or commercial customers beyond the cost of the device specific functionalities.

In addition, costs are driven up further because consumers and/or commercial customers have to purchase a separate robotic device for each type of task they would like the robot to perform, and each of these robots carries with it its own expensive control electronics and sensors. While the device specific functionality of each robotic device may provide unique value and capabilities, such as when purchasing one robot that vacuums and a different robot that mops the floor, the expensive control electronics and sensors may provide redundant functions across the different robotic products. The consumers and/or commercial customers end up bearing significant extra costs for this redundancy as they purchase multiple robotic products.

Further, if a robot malfunctions, the replacement cost is also high because of the expensive control electronics and sensors must be replaced with the entire unit. In addition, most robotic devices are not easily upgraded without complete replacement of the entire unit, as the expensive components and/or circuit boards are not modular to the robotic device. This may also prevent new features and behaviors from being added to the robotic devices. This may also make support costs higher by having to provide technical support and customer service for a broad range of non-standard devices.

Manufacturers and software developers also have high costs because there is no common platform and architecture for manufactures to leverage for higher scale production, nor for which programmers can write applications and behaviors leveraged across the development of multiple devices. For each different type of device, manufacturers have to develop new control electronics and software developers have to write custom software to operate with the control electronics. Further, if a third party wants to develop a new peripheral or component, the third party has to also write additional software and/or create new control electronics to interface the robot device with the new peripheral or component.

Consumers and commercial customers may also experience limited benefits for the cost incurred in this model, as technology advances in the control electronics, sensors and software that enhance the performance and capabilities of one line of products may not be easily transferred to another line of products. Furthermore, information and learning gathered at the local level by a robotic device that is used to optimized its performance, such as a robotic vacuum cleaner learning over time the most efficient and complete method for covering an consumer's home, may not be easily shared with different floor cleaning robots (e.g., a robotic mopping device) to improve the performance of all of the consumer's devices.

Accordingly, there is a need for creating a common platform and architecture that can be implemented across multiple robotic devices to enable modularity in functions, where key elements of the robotic control electronics, sensors and software functions are abstracted from the device specific functions and mechanisms.

BRIEF DESCRIPTION OF THE DRAWINGS

FIG. 5 illustrates a TICD and an intelligent toy according to an embodiment of the invention.

DETAILED DESCRIPTION OF THE PREFERRED EMBODIMENT

A transferable intelligent control device is proposed that would enable manufactures and developers to produce much lower cost robotic devices (bodies) that provide device specific functionality without the cost burden of the control electronics, sensors and software described above, where the robotic devices would be compatible with one or more types of a transferable intelligent control device (a brain) which consumers and/or commercial customers can purchase and re-use across multiple types of lower cost robotic devices (bodies.)

A Transferable Intelligent Control Device (TICD) is a modular intelligent device. The TICD utilizes a platform architecture and communication protocol. The TICD interfaces, controls and executes integrated behaviors with different devices (e.g., robots, appliances, toys, computers, game systems, machines, sensors, mechanisms, other electronic products, and/or digital products) independent of the different devices' overall preexisting electrical, mechanical, functional and physical configuration.

Figure 1A:
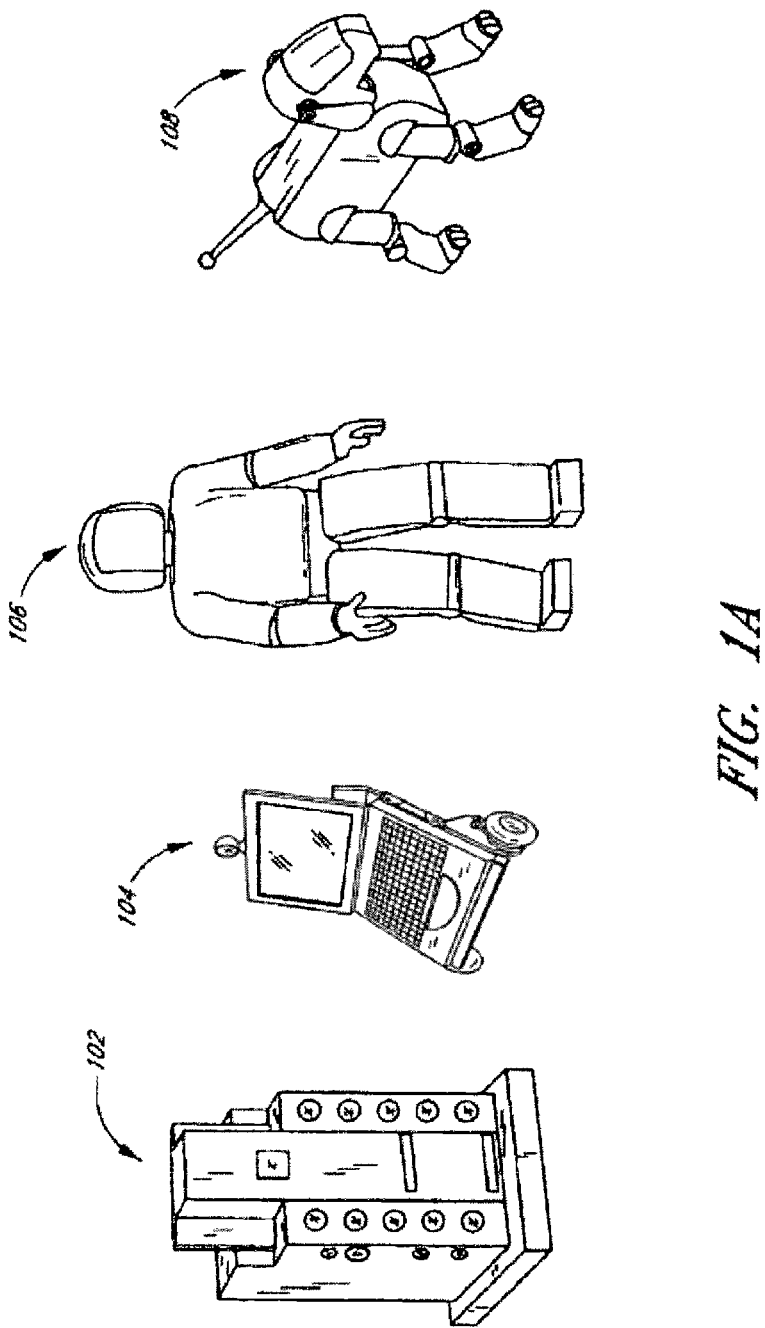
FIG. 1A illustrates examples of different types of robots.

FIG. 1A illustrates examples of different types of robots. Robots can be used in a very broad variety of ways and can correspond to a very broad variety of configurations. For example, a first robot 102 can correspond to an automated transport device for medical supplies in a hospital. A second robot 104 can correspond to a robot for research and hobby. A third robot 106 can correspond to a humanoid robot. A fourth robot can correspond to a toy for entertainment purposes. It will be understood that many other configurations for robots are possible.

The TICD architecture and protocol provides a systematic division in functions. The TICD operates as a "portable brain." In an embodiment of the invention, the TICD can be detachably connected to a variety of "bodies" (devices) to add intelligence, transfer knowledge, and/or integrate additional functions, capabilities and/or behaviors to the devices' existing functions, capabilities and/or behaviors. In an embodiment of the invention, the TICD adds intelligence, transfers knowledge or integrates the additional functions, capabilities and/or behaviors by transferring this information via a wireless communication protocol (or a wired communication protocol), to another device.

In addition to the above-described functionality, the TICD's architecture also electronically transfers (utilizing software, data files, binary code, and/or other means) knowledge, functions, capabilities and/or behaviors between different TICD units and/or other products, devices, software programs and/or applications compatible with the TICD's architecture, protocols, and/or components thereof.

Figure 1B:
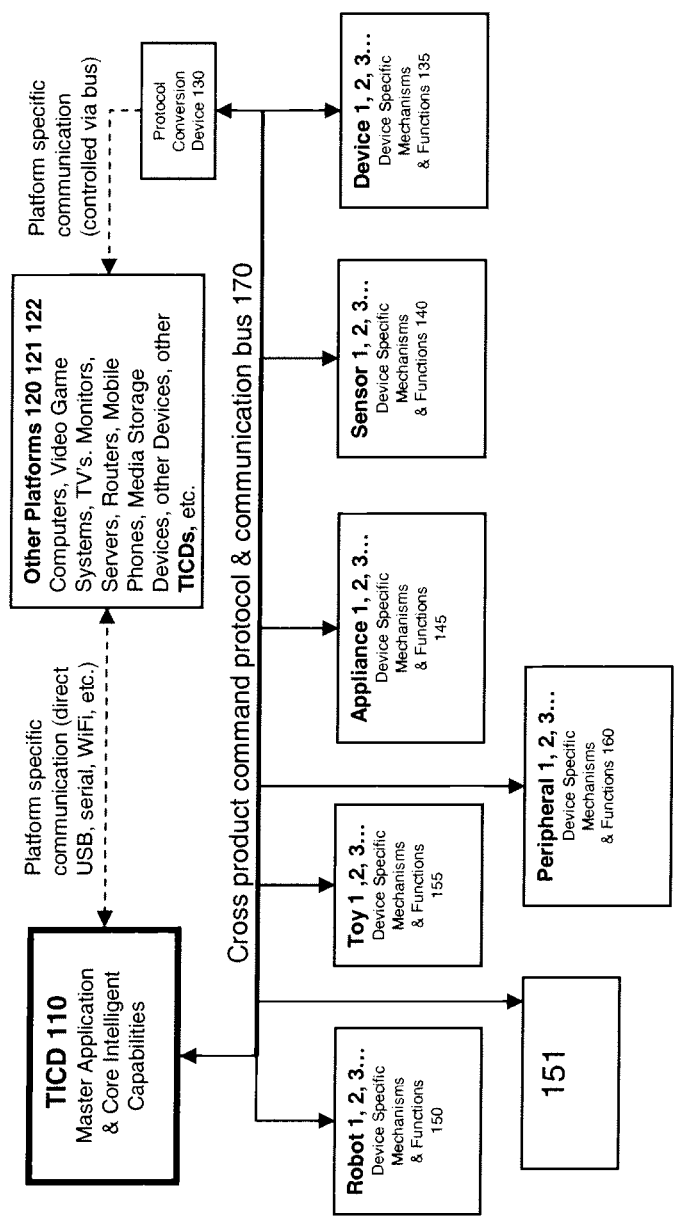
FIG. 1B illustrates a transferable intelligent control device (TICD), a number of devices to which the TICD may be connected and additional components, to which the TICD may connected, according to an embodiment of the invention.

FIG. 1B illustrates a TICD, a number of devices to which the TICD may be connected and additional components, to which the TICD may connected, according to an embodiment of the invention. The system 100 includes a TICD 110, a protocol conversion device 130, a device 135, a sensor 140, an appliance 145, a toy 155, a peripheral device 160, and a robot 150. A second robot 151 may also be included in the integrated system. The TICD 110 also interfaces with the other platforms or devices 120. Also, a number of additional electronic device platforms 121 and 122 may also be connected to the integrated system and the TICD 110 may also interface with TICD. The TICD 110 and the other devices, e.g., devices 130, 135, 140, 145 and 150 may be connected with each other via a communication bus (e.g., a cross product command protocol & communication bus, which may be referred to as a cross product bus 170). FIG. 1B illustrates a number of scenarios of connecting (or coupling) the TICD to various electronic devices.

In an embodiment of the invention, the TICD 110 may be connected to a robot 150. For example, the robot 150 may be a wheeled-based robot connected via the TICD's cross product communication bus 170. Once connected, the TICD 110 may intelligently drive and navigate the robot 150 around a user's home. The TICD 110 may intelligently control some or all of the other functions of the robot 150, which may include internal functions and/or system operations within the robot 150 as well as external functions, outputs, and/or behaviors of the robot 150. Under certain operating conditions, the robot 150 may only have a minimal set of basic initial commands stored within memory in the robot 150 that enable the TICD 110 to communicate with the robot 150 and/or access systems within robot 150, and/or control the functions of the robot 150. Under other operating conditions, the robot 150 may have some installed initial commands, functions and/or behaviors that enable it to function in a limited mode when not connected to the TICD 110, which may or may not be utilized when the TICD 110 is connected. Under other operating conditions, the robot 150 may have memory of information previously input and/or information learned from a prior operation and/or from another environment in which the robot 150 had operated before m which may or may not be utilized when the TICD 110 is connected.

In an embodiment of the invention, the TICD 110 may adapt the commands, data and other information it exchanges with the robot 150 (or other devices connected through the cross product bus 170) based on the identification, requirements, capabilities, functions and/or configuration of and/or information stored on the robot 150 and/or other devices.

In an embodiment of the invention, the TICD 110 may adapt to the robot 150 (and/or other devices connected through the cross product bus 170) through the use of device-independent instructions which allow universal communication and/or control across different types of devices. In an embodiment of the invention, information stored on and/or characteristics of the robot 150 and/or other devices may be used by the TICD 110 to determine which instructions and/or class of instructions may be executed by the robot 150 and/or other devices.

In an embodiment of the invention, the TICD 110 may utilize a mix of device independent-instructions and device-dependent instructions for interfacing with devices connected through the cross product bus 170. Examples of the different cases are described in the following examples of a wheeled mobile robot 150 and legged mobile robots 151.

In another embodiment of the invention, the TICD 110 may adapt to the robot 150 (and/or other devices connected through the cross product bus 170) through the use of device-dependent instructions, whereby the TICD 110 adjusts (or translates) some or all of its instructions to be relevant the robot 150 (and/or other specific devices) based on specific functions, capabilities and configurations of the robot 150 (and/or other devices). In an embodiment of the invention, the robot 150 (and/or other devices) may contain information, data, routines and/or other resources needed for the TICD to utilize, adjust and/or translate its instructions to be compatible with the robot 150 (and/or other devices).

In an embodiment for the wheeled robot 150, the TICD 110 may assume partial or total control over the navigation and movement of the robot 150 when the TICD 110 is connected to the robot 150. Under certain operating conditions, the TICD 110 will send navigation commands and other commands for the robot 150 to implement using device-independent instructions. In other words, device-independent instructions are not instructions that are specifically designed or coded for a specific device or robot. Instead, the device-independent instructions are general instructions, which in the case of a mobile robot could include move forward, move backward, move a certain distance, move left, move right, move in a direction towards a specified heading, continue to move in a direction until otherwise instructed by the TICD 110, continue to move in a direction until detecting an obstacle, continue to move into a direction until detecting an certain external signal, continue to move in a direction until detecting a certain object or state within the environment, and stop movement.

In this example, the instructions are general to a variety of mobile robots or devices that have the ability to move, independent of how the robot or device achieves its movement. For devices that do not have the ability to move, the TICD 110 may determine this through a number of ways, which may include, but are not limited to: (1) a response from the device that the requested instruction is not supported by the device; (2) information stored on the device (and/or other locations) that enables the TICD to determine which instructions and/or class of instructions are supported by the device; and/or (3) the TICD monitoring the outcomes of instructions sent to the device and determining which functions are supported. In embodiments of the invention, a function has to be relevant to the device. In other words, there is a class of devices that the commands may apply to.

Further, information learned by the wheel-based robot 150 (after the TICD 110 has been attached) while the robot 150 is in operation may be automatically uploaded to and stored in the TICD 110 in a non-volatile memory.

The user may then unplug the TICD 110 from the wheeled-based robot 150 and physically transfer the same TICD 110 to a second robot 151. The second robot 151 has a completely different form of mobility, e.g., mechanical arms and legs (and not wheels). The user physically/electrically connects the TICD 110 to the second robotic device 151 via the TICD's communication bus 170. After the TICD 110 is connected, the TICD 110 is able to control the actuation of the mechanical legs and navigate the walking robot 151 around the home, as well as operate the robot's arms. To perform these actions, the TICD 110 utilizes the same device-independent instructions that are discussed above, (e.g., move forward, move backward, move a certain distance, move left, move right, move in a direction towards a specified heading, continue to move in a direction until otherwise instructed by the TICD 110, continue to move in a direction until detecting an obstacle, continue to move into a direction until detecting an certain external signal, continue to move in a direction until detecting a certain object or state within the environment, and stop movement). Information learned while the TICD 110 was operating on the first robot 150, such as the location of rooms within the house where the first robot 150 operated, and is now available to the second robot 151 utilizing the internal memory of the TICD 110 which stored the information as the first robot 150 was operating.

In a further embodiment of the invention, the TICD 110 may utilize device-dependent instructions to direct the movement of the second robot 151, either in combination with the device-independent instructions and/or instead of the device-independent instructions. As an example, the second robot 151 with legs may have specific movement behaviors that are unique to its configuration, functions and/or capabilities. These behaviors may include specific styles of legged motion, such as skipping, hopping, jogging, jumping, shuffling and/or running. All of these behaviors may be used to control the movement of the robot 151, but they may not be relevant to other mobile robots. In this example, the TICD 110 may use device-dependent instructions to activate these specific behaviors for the second robot 151 with legs. In an embodiment of the invention, the robot 151 and/or other devices may contain information, data, routines and/or other resources needed for the TICD 110 to utilize, adjust and/or translate its instructions to control these device specific behaviors.

FIG. 1B further illustrates that the TICD 110 can control other devices and is not limited to controlling robots 150 151. Rather, the TICD 110 may integrate with any electronic product or electronic device that is compatible with the TICD's communication bus and command protocol 170.

In other embodiments of the invention, the TICD 110 can connect to peripheral devices 160 (wireless joystick, touch screen, digital camera), toys 155 (e.g., an electronic game, interactive doll, radio controlled vehicle), appliances 145 (e.g., robotic vacuum cleaner, dish washer, security system, home automation system,) sensors 140 (e.g., obstacle detection sensor, position sensor, visual sensor) other devices 135 (e.g., robotic arm, autonomous or semi-autonomous vehicle) through the cross product bus 170. The TICD 110 may also interface or be coupled to third party products and devices 120 (e.g., video game console, PC, mobile phone, media storage device) through the use of a protocol conversion device 130 that enables the TICD 110 to interface with the third party products and devices 120 with the cross product bus 170.

In an embodiment of the invention, other devices with different functions (e.g., a controllable digital camera 161) may be added to the TICD cross product bus 170 to coordinate input and/or behavior across multiple devices. Device-independent instructions and/or device-dependent instructions may enable the second robot 151 to now walk around and additional device-independent instructions (e.g., capture image at a certain time) and/or device-dependent instructions (e.g., capture an image at a specific zoom and focus setting for the digital camera 161) may instruct the digital camera to take pictures of different locations within the environment.

In an embodiment of the invention, the TICD 110 may use different sets of general instructions that are not related to the movement of a mobile robot, but apply to a variety of devices that share some other type of functionality in common. One embodiment may include instructions from the TICD 110 related to communication between a device and a human user. The TICD 110 may for example use a device to communicate that a task has been completed. The TICD 110 may send a general instruction for the device to indicate a "completed" status to the user, where the device may communicate this status differently based on its user interface, such as by saying the word "completed" on a device that has a speaker and speech capabilities, displaying the word "completed" on a device that has an LCD display capable of showing text, and/or changing the status of an indicator LED on a device that represent completion of a task.

FIG. 1B also illustrates that in another embodiment of the invention, the TICD 110 may also be linked to one or more other existing platforms 120 (such as connecting with a computer or video game system) through native communication hardware and/or protocols (such as USB or BlueTooth) supported by the platform's operating system. As one example, the TICD 110 may connect to a wireless router (e.g., another device platform 121) through a standard protocol for communication, such as a WiFi communication module, where the wireless router may in turn be linked to the Internet. This would allow liking of the TICD 110 to the Internet by way of the wireless router 121. In other words, the linking to the wireless router 121 allows remote access to the walking robot 151 via the Internet. The walking robot 151 may be instructed to go to different locations in its location through commands sent from the remote location to the TICD 110 via the Internet and pass along by the wireless router 121.

Further examples may include the TICD 110 communicating with a mobile phone via BlueTooth wireless communication, where the TICD 110 may receive information and/or instructions from the phone, and/or where the TICD 110 sends information to the phone and/or submits commands via the phone application interface protocol. Another example may include the TICD 110 communicating over an IP network to a variety of network devices through a standard communication protocol such as TCP/IP. Another example may include the TICD 110 communicating with a USB peripheral device, such as a game controller or joystick, through the use of device specific drivers installed on the TICD 110 to make it compatible with the device's specific protocol.

Because the TICD 110 may connect to other electronic products or electronic devices, the TICD 110 is flexible for interfacing with a range of products, from low cost devices which do not have any existing communication infrastructure for communicating with external devices, to products and/or platforms that have robust communication infrastructures readily available for use and actively supported by their respective development communities.

In the TICD system 100, the TICD 110 may also perform higher level functions that provide intelligent behavior. Illustratively, these functions may include, but are not restricted to: 1) sensory data acquisition and fusion; 2) information storage and retrieval; 3) running of software routines and algorithms; 4) interfacing with end-users; 5) accepting and interpreting commands; 6) communicating with other devices (either directly or through intermediary devices); 7) distributing computing across devices; 8) selecting behaviors, such as switching to a lower driving speed when people and/or obstacles are detected to maintain a margin of safety, or engaging an obstacle avoid maneuver when a robot encounters something blocking its path; 9) planning actions; such as determining the best course to take in navigating from one point or another, or sequencing a set of tasks based on the optimal use of resources and time; 10) making decisions, such as deciding when to suspend a specific action if progress toward the desired outcome is insufficient, or selecting one approach versus another for attempting to complete a specific task; and 10) sending commands to control electrical, mechanical and/or digital devices.

The TICD System provides efficiencies to the robotic device market. One of the efficiencies is product cost. The TICD 110, the same core device is utilized to control a variety of different products. This saves product costs because, for example, the control electronics and global sensors (which are generally expensive components and key cost drivers,) do not have to be replicated in each device. Instead, the companies may be able to make cheaper devices by just making the devices compatible with the TICD, The cost of the device may then be focused on the specific behaviors and functionalities of the device's intended use. For example, with a robotic vacuum cleaner, the majority of cost would go into the vacuum mechanism, the power supply and the mobile platform for driving the vacuum around. Only a small percentage would go into the minimal control electronics needed to interface needed to interface with the TICD.

The consumer also benefits from these cost efficiencies because the cost of each additional robotic product they purchase is lower because they can re-use the TICD for multiple robotics. This helps the consumer recoup their investment in the TICD.

In terms of support and upgrades, the separation of the TICD allows (1) both users to upgrade or replace the vacuum cleaner after a period of operation without having to get a new TICD and (2) users that have a good working vacuum device would upgrade their TICD to enhance the vacuum's intelligence.

Manufacturers and software developers also benefit by having a common platform and architecture that programmers can write applications and behaviors both for specific products, as well as across products. Thus, the TICD enables a software market for the devices. Consumers may purchase software to add behaviors and functionality to their products while keeping the same hardware. This software may be programs for use on the TICD, updates to the connected devices and/or software that runs on other platforms that can interact with the TICD.

This is also a benefit and expands the market for third party devices that can connect to the TICD through the cross product bus, such as a new sensor or peripheral that can be used with a variety of products. In this case, the third party just has to make this peripheral or sensor compatible with the TICD, rather than designing individual versions for each of the different types of devices.

Figure 2:
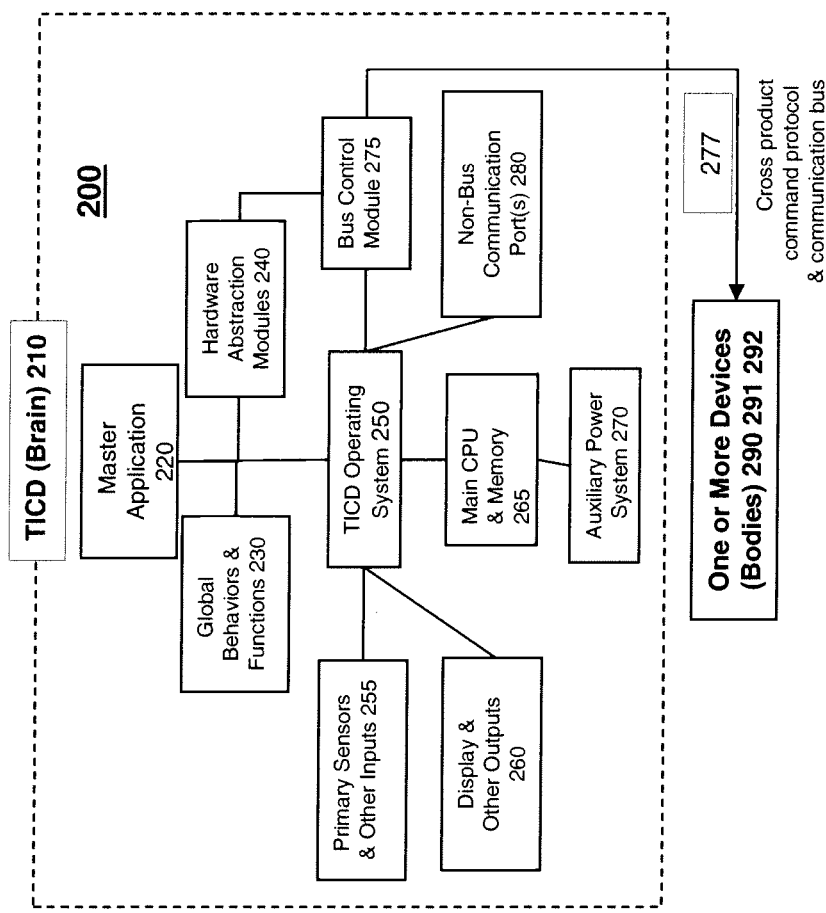
FIG. 2 illustrates a block diagram of the TICD according to an embodiment of the invention.

FIG. 2 illustrates a block diagram of the TICD according to an embodiment of the invention. In one embodiment of the invention, the TICD 210 may includes a master application 220, a global behaviors and functions module 230, a hardware abstraction module 240, a TICD operating system 250, primary sensors/other inputs 255, display/other outputs 260, main CPU and memory 265, an auxiliary power system 270, a bus control module 275, a cross product bus 277, and a non-bus communication port 280. The cross product bus 277 connects (or couples) the TICD 210 to one or more electronic devices 290 291 292 (which may also be referred to as a body). FIG. 2 illustrates one embodiment for defining and organizing the primary components of the TICD 210 architecture. In this embodiment, the illustrated system of key modules provide the TICD 210 versatility in connecting and controlling a broad range of products and devices.

The bus control module 275 provides a standard communication link for recognizing devices 290 connected to the cross product bus 277, reading relevant information from these devices 290 (which may include the identification of the device, information on the configuration of the device, the functions it supports, and/or what commands are applicable to the device), and sending commands back for execution by the target device or devices 290 that the TICD 210 is controlling.

In an embodiment of the invention, the bus control module 275 may utilize an existing interface system such as $I^2C$ to provide a common protocol for communication and control across devices via the cross product bus 277. Other protocols that may be utilized on the cross product bus include, but are not limited to, the USB protocol, he MIDI protocol, the WiFi protocol, the Bluetooth protocol, the TCP/IP protocol, and/or custom/proprietary protocols. The TICD 210 may use one or a number of the protocols to send commands and/or pass along data and/or information via digital signals (and/or analog signals) and to read data, information and/or control signals back from the one or more devices via digital signals and/or analog signals. In an embodiment of the invention, the TICD 210 may pull data from one or more devices to monitor their operation, directly read sensor values, read the state of software tasks and/or variables, read information gathered by the device from its environment and/or other devices, and/or read data stored in memory. Under certain operating conditions, the information transmitted according to any of the above-identified protocols may include, but is not limited to, a device ID, one or more commands to execute, parameters or variables associated with the commands, software routines, attached files and/or any other relevant data.

For example, in an embodiment of the invention, the device to which the TICD 210 may be connected is a wheeled robot. The TICD 210 may send a motion command to a device such as a wheeled robot 150, the motion command identifying that movement of the wheeled robot has to be made in a specific direction for a specific distance. The TICD 210 translates the desired outcome (e.g., moving to a specific point) into a command or set of commands which are sent to the wheeled robot 150 device which results in the robot driving its left and right wheels in a way so that the robot arrives at the desired point. More specifically, the motion command can be digitally transmitted to the wheeled robot to be interpreted and executed with the appropriate low level software and hardware functions residing on the wheeled robot itself. The resulting motion function (in this case, the action of moving) may be specifically executed at the wheels of the robot by applying a certain amount of voltage to a specific motor at a certain modulation for the specified time to make the wheels move in the designated direction. This process may occur entirely at the device level, where the function executes entirely on the wheeled robot 150 until completion, but may also occur where the TICD 210 monitors information (such as estimated distance traveled, slippage read from sensors on the robot's wheels, and/or current position estimate derived from other sensors and/or devices) and updates the command or commands sent to the wheeled robot to adapt the robot's function(s) and/or overall behavior. This separation between the general instruction (e.g., the motion command or set of commands) and the actual functions executed by the device (e.g., the wheeled robot) allows the TICD 210, with its general instructions, to drive a wide variety of products and/or devices through this common set of software commands regardless of the type of motors or actuators, power system, electronic control systems, low level software drivers and other control or intelligence elements specific to the device.

In an embodiment of this invention, these instructions may include: (1) device-independent commands (e.g., such as move forward 3 feet, turn 90 degrees to the left, return to the recharging station,) which apply to a variety of mobile robots, including a wheeled robot 150, a legged robot 151, and other mobile robots and/or devices capable of movement; (2) device-dependent commands (e.g., shuffle forward 3 ft, pivot on the right foot and turn 90 degree to the left, or walk back to the recharging station) which apply only to a specific legged robot 151 or specific sub-group of legged robots; and/or (3) a combination of device-independent and device-dependent commands.

The TICD 210 and the remote devices may interact in different modes, including but not limited to master/slave control, peer to peer communication, synchronous communication, and/or asynchronous communication.

The physical bus connector or physical interface for the cross product bus 277 may be implemented through a variety of connectors, including but not limited to: an RJ11 modular connection or similar modular connection system; an Ethernet connection; a Serial Communications (RS232) connection; a USB connection; a FireWire connection; an optical link connection; or an audio/video connection system. In other operating environments, the cross product bus 277 may be a virtual bus and communication may be implemented using a wireless communication/connection system, including but not limited to: WiFi, BlueTooth, RF, IRDA, RFID or any other wireless connection protocol. In other operating environments, communication may be implemented utilizing any custom or proprietary wired or wireless connection system.

In certain embodiments of the invention, power can be provided along the cross product bus 277. If power is provided by the cross product bus 277, the TICD 210 and other devices 290 291 may tap into the power of other devices connected to the cross product bus 277. These other devices may include a central device that hosts the power system for cross product bus 277, and/or a designated power device that serves as a primary, supplemental and/or auxiliary battery. The TICD 210 may be designed to have it's own power source built in as part of the TICD unit, to enable it to operate when detached from any other powered device, as well as maintain power when other attached devices are running out of power. In certain embodiments the TICD 210 may provide the power for all or part of the overall system of connected devices. The TICD 210 may also draw power from an external source (such as through a USB connection to another device). The cross product bus 277 may also allow the distribution of power from any specified device that has its own power source to other devices connected or coupled to the cross product bus 277.

The TICD 210 may also include a Hardware Abstraction Module or a plurality of Hardware Abstraction Modules 240.

A Hardware Abstraction Module 240 allows the TICD 210 to operate devices that have different functions and configurations because the TICD 210 utilizes general instructions and not device-specific instructions. When a new device 290 is connected to the TICD 210, software resources within the modules of the TICD may be updated with data, settings, commands, routines, programs and/or other resources needed to make all of the new device's 290 functions available to the TICD 210. These updates allow the TICD 210 to control the new device 290. Modules within the Hardware Abstraction Module 240 of the TICD 210 may change and/or adapt based on the set or type of devices 290 connected to TICD 210.

For example, the modules within the Hardware Abstraction Module 240 may include, but are not limited to any representation and/or description of the connected device or devices 290 that allows the TICD 210 to successfully control the devices' functions. This may include (1) an identification of the device, which can include a general classification for devices that share common traits (e.g., mobile robot type 2), a specific model of a device, and/or a specific device unit number (e.g., for use in differentiating similar units and/or retrieving relevant historical information); (2) a physical description of the device 290 and the device's key components; (3) a database of the inputs, outputs and functions available on a specific device 290; (4) a mapping of commands for accessing those inputs, outputs and functions of the device 290; and/or (5) any supporting resources such as parameters, description files, settings and/or routines that enable the TICD 210 to perform integrated behaviors using the connected device or devices, and/or (6) links and/or directions to external network locations that provide access to any supporting drivers, software programs, data and/or any part the resources identified in items (1) to (5)

In an embodiment of the invention, the Hardware Abstraction Modules 240 on a TICD 210 may be updated from memory stored on the device when the TICD 210 is connected to that device 290. For example, in a robotic vacuum cleaner, the TICD 210 can read information and/or resources from memory in the device (vacuum cleaner) which includes, but is not limited to: (1) the make/model of the vacuum cleaner, and/or its specific unit number which may be used in looking up information related to the vacuum cleaner; (2) any general classification that identifies existing libraries of instructions that apply to the vacuum cleaner; (3) the specific list of functions available on the vacuum cleaner, such as driving controls, cleaning controls, user interface systems, internal monitoring systems, etc.; (4) device specific commands and parameters for accessing those controls through a communication bus of the vacuum cleaner; (5) intermediary settings available on the device, such as modes for high or low power cleaning; and/or (6) links and/or directions to external network locations that provide access to any supporting drivers, software programs, data and/or any part the resources for the vacuum identified in items (1) to (5). The TICD 210 may query this information by issuing a command to the connected device 290 through the cross product communication bus 277 to upload the information saved in the memory of the device 290. The TICD 210 may save a copy of some or all the information in the Hardware Abstraction module 240, and/or use the information to adjust settings in the Hardware Abstraction module 240, and/or load in specific commands and/or routines into the Hardware Abstraction module 240, and/or retrieve from its own memory and/or external locations command sets matched to the device 290.

The TICD 210 may also read in software routines and/or programs that can operate, support and/or interface with intermediary functions, capabilities and behaviors specific to the device 290. In an embodiment of the invention, the TICD 210 may read this information from memory in the device 290, read from memory previously stored within Hardware Abstraction Module 240 of the TICD 210, read from memory externally stored, where the information on the device 290 points to the external source, and/or a combination of the described approaches. For example, with the robotic vacuum cleaner, the robotic vacuum may have a class of behaviors that are unique to its specific design and/or function. Illustratively, the robotic vacuum cleaner may have a specific wall following system for cleaning along the side of walls, which relies on the interplay of the reading of sensors, configuration of the motors and wheels, cleaning system design, current cleaning mode, historical information, and other elements that support the wall following behavior. The commands, parameters and/or routines for operating the wall following behavior may be loaded into the TICD 210 to which ever level needed to enable the TICD 210 to successfully implement the behavior and coordinate it with the TICD's 210 other operations. In an embodiment of the invention, the TICD 210 may take on (or implement) some, or all, of the software processing needed to execute the behavior, with the remaining operations are performed on the device itself and/or other devices.

In embodiments of the invention, the updates to the Hardware Abstract Modules 240 are available as resources to the TICD's Master Application Module 220. In an embodiment of the invention, the Master Application module 220 provides the central logic, software routines and commands for controlling the TICD's 210 behavior as well as any behavior by one or more connected devices 290. The Master Application module may also provide the central logic, software routines and commands for communication with other devices. The logic of the Master Application module 220 may be implemented in any manner that provides the needed functionality. One embodiment may include a script that schedules a set of tasks, either in parallel or in serial mode, for the connected devices 290 to perform and criteria for determining when to end one task and begin another. Another embodiment may include a software state machine, which activates different tasks for the connected devices 290 to perform based on certain conditions, external events, data input and/or internally derived data values. Another embodiment may include a hybrid model involving one or more scripts, one or more state machine programs, and/or other general methods used in software computing.

In an embodiment of the invention, the Master Application module 220 utilizes the information, data, routines and/or other software applications resources within the Hardware Abstraction Modules 240 to localize and/or adapt its commands and/or operating functions to be compatible with the device or devices to which the TICD 210 is connected. The combined function of the modules (220 and 240) enables the TCID 210 to interface with one device as if it is part of the TCID 210.

The TICD 210 includes a Global Behaviors and Functions module 230. The Global Behaviors & Functions module 230 provide core functions within the TICD 210 that are independent of the connected product or device. Examples may include but are not limited to core systems for: (1) a navigation system; (2) a positioning system; (3) a vision recognition system; (4) a speech recognition system; (4) a personality system; (5) an emotional expression system, (6) memory of settings or elements within environments; (6) an optimization system derived from past performance; (7) a planning system; (8) a decision making system; and/or (9) a behavior management system. As a general description, these behaviors and functions usually are consistent in the TICD 210 regardless of the specific product applications to which the TICD 210 is attached.

One core capability is a navigation control system. Navigation control may be defined as any behavior that tells the robot where to move, either by direction, target location or other method. At a high level, these navigation control functions may be abstracted to be general behaviors (i.e., device-independent behaviors) such as go forward 1 meter, turn left 25 degrees, or go to a specific location, e.g., the charging station or the kitchen. In each of these examples, the behavior may be focused on an external reference point (or direction) that is independent of how the specific vehicle (device) 290 mechanically moves to that reference point. Thus, for example, regardless of whether the robot device 290 drives with two wheels, four wheels or walks, the navigational control function (which is part of the Global Behavior and Function module 230) determines the robot's location, plans its course, and monitors its progress.

In embodiments of the invention, the device-independent behavior may be performed by the TICD 210 sending a device-independent command to the robot device 290, such as go forward 1 meter, and/or implemented as device-dependent command to the robot device 290. In this example, the use of device-independent and/or device-independent commands is managed separately by the Master Application module 220 and Hardware Abstraction module 240, and does not impact the functions of the Global Behavior and Functions module 230.

An additional core capability is the sensory systems, for example, the vision recognition system. With vision recognition capability, a robot or device 290 may interact with its environment by recognizing objects, people, places, images, visual patterns, or other vision indicators. A vision recognition system's function does not change with a type of robot (or from one type of robot to another type of robot). Instead, a robot's design (e.g., wheeled vrs. arms only vrs. arms/legs) impacts how the vision recognition function is applied. For example, the vision recognition function of the robot utilizes vision to guide a robotic arm to grab a soda can, or to recognize what room it is in and drive to a specific place.

Another core capability in the Behavior and Functions module 230 is higher level intelligence and decision making system. For example, the higher level intelligence and decision making core capability may include game play. The rules and strategies for guiding a player's action in game play may also be abstracted from the specific robot and centralized into the behavior and functions module 230. Rules and strategies may include how the robot plays offense or defense, how it coordinates with other players, how it adapts to different scenarios and/or other processes and behaviors for playing games. The robot or device 290 has conditions or operational parameters that may provide inputs into the behavior and functions module 230, such as how fast it can move or deciding which actions to take. These conditions or operational parameters may be treated as variables in the decision making routine. Furthermore, learning from the successes and/or failures of these strategies may be passed on to other robot devices 291 292 and incorporated into the other robot devices' decision models, again independent of the specific other robot's 291 292 configuration.

The Master Application module 220 serves as an overall controlling software for the TICD 210 that integrates the Global Behaviors & Functions module 230, the Hardware Abstraction Modules 240 and other functions/modules within the TICD 210 to provide integrated control over the connected devices 290. The Master Application module 220 achieves the desired tasks or goals set by the user of the robot. Illustratively, the following scenario provides one example of the Master Application's 220 role within the system.

In the case of a robotic racing game, the Master Application 220 runs the selected game program and utilities specific resources within the Global Behavior & Functions Module 230, the Hardware Abstraction Module(s) 240 and other functions within the TICD 210 when needed. Illustratively, the game program allows the selection of a specific course and settings for how a car may be driven against the other cars in the race from input from the user. The user input can include, but is not limited to: the user making the selection on the TICD 210 itself (e.g., buttons and display) and/or through the TICD's 210 sensory systems; the user making the selection through an interface on the device 290 itself and/or the device's 290 sensory systems; the user downloading the information through a connection from another device; and/or the user activating the selection through an another device connected to and/or in communication with the TICD 210, where one embodiment may be selecting the course from a menu on a computer game running on a game console that is connected to the TICD 210 via a WiFi connection.

The Master Application module 220 may initialize the system to be ready to perform the race, as well as to control a series of stages of the car's operation. The stages range from the beginning of the race to the end of the race. For example, the Master Application Module 220 may include functionality for initiation that may include, but are not limited to, updating and/or configuring any needed information into the Hardware Abstraction Module(s) 240 that pertain to the race program and also to the device(s) connected to the TICD. This information include commands and/or routines for controlling the car's driving functions specific to its driving characteristics and/or capabilities. In addition, the Master Application Module's 220 initialization routines (or functions) may include loading and/or configuring any behaviors and/or functions into the Global Behaviors and Functions Module 230 that are relevant to the race, such as the navigation system, the track configuration, decision making for when to turn, speed up or slow down based on the position along the course, maneuvers for attempting to pass other cars and block the other cars, and/or the point scoring system of the game.

After the race has started, the Master Application Module 220 may select a relevant set of goals and/or tasks for each stage of the race, such as driving to the first turn, and then call on functions in the Global Behavior and Functions Module 230 to provide the sensory data and high level behavioral instructions needed to drive the car to that location and also take account of the positions of the other cars. Illustratively, these high level instructions may include a direction, a speed and a specific set of maneuvers for the car to drive the first stage of the course, e.g., driving to the first turn. After those high level behavioral instructions are selected, the Master Application Module 220 may interface with the Hardware Abstraction Module 240 to access information, settings, routines and other resources specific to the car and so that the Master Application Module 220 can output translated instructions as specific commands for the car to execute.

For example, in the case of driving to a specific point along the course, if the selected instruction is to turn 10 degrees and drive at a specific velocity until the next instruction is selected for the next stage of the race, the Master Application Module 220 can utilize resources in the Hardware Abstraction Modules 240 to translate the instructions to a specific set of commands, which the Master Application Module 220 outputs and that the car device can read through the communication bus 277. The specific set of commands may include a specific sequence of lower level commands, which control the car and make the car execute a turn. In addition, the specific set of commands may also include settings that adjust the speed of the motors based on the physical characteristics of the cars to achieve the specific velocity.

In one embodiment of the invention, the Hardware Abstraction Modules 240 may enable two cars of different driving characteristics to race head to head, where each had its own TICD loaded with the same game program. One car may have more powerful motors than the other car and a faster speed for turning. If the cars were driving by the exact same instructions to its hardware, the faster car might overshoot and overturn relative to the other car assuming the instructions were calibrated for the slower car. In this example, the Hardware Abstraction Module 240 provides the means for calibrating both cars to perform similarly, for example by setting the velocity and length of turns of the faster car so they are more proportional to the slower car.

In one embodiment of the invention, the Hardware Abstraction Modules 240 may perform the translation function as an independent process within one or more of the Hardware Abstraction Modules 240. In this configuration, the Master Application Module 220 outputs the desired higher level instructions as input into one or more of the Hardware Abstraction Modules 240 to process and covert as commands to send to the car through the cross product bus.

In another embodiment of the invention, the Master Application Modules 220 may directly output commands to send to the car through the cross product bus 277, where the Hardware Abstraction Modules 240 are used as resources for the Master Application Module 220 to perform the translation. One example may include where the Hardware Abstraction Modules 240 provide a look up table for adjusting the settings of the instructions into commands that are normalized for the car. Another example may include where the Hardware Abstraction Modules 240 provide specific software subroutines and system calls that the Master Application Module 220 makes calls to and retrieves results base in the process of determine which commands to output to the car.

The game application may continue to a next stage as the game application progresses towards the goal. In addition, other processes that provide a similar function and/or outcome may also progress to a next stage. As the application progresses, the Master Application module 220 can keep track of the stage of the program and the desired tasks and/or goals that are still left to perform. The Global Behavior and Functions module 230 may provide key system resources and high level instructions needed to perform the task and/or goals. The Hardware Abstraction Module(s) 240 may enable the Master Application module 220 to translate the high level instructions into commands specific to the connected device or devices 290; and the Control Bus 277 relays the commands to the correct device 290 for execution.

The integrated system 210 is modifiable, the TICD 210 itself is modifiable because the Master Application Module 220, the Global Behaviors and Functions Module 230, the Hardware Abstraction Module(s) 240, the Bus Control Module 270, and other resources may be updated to incorporate new features and/or capabilities.

The TICD system 210 is modular and extremely flexible. The TICD system 210 may be actualized using alternative implementations and/or variations other than the embodiment illustrated in FIG. 2. The alternative variations may be implemented by combining any of the modules in FIG. 2 into a single module, re-defining divisions in functions described, and/or separating the above-illustrated modules out further into smaller functions (i.e., modules). These alternative embodiment variations may include, but are not limited to, other software, mechanical and/or electrical configurations to allow the TICD application 210 to perform key functions and common behaviors across a range of different devices 290 291 292.

As one example, a basic condensed form of the architecture may be used to implement a program for a simple set of interactive toys (devices) 290, where the TICD 210 may plug into several different types of toys 290, but the software written for the TICD 210 is collapsed to where the Hardware Abstraction modules 240 is a single software variable that corresponds to the ID number representing the specific type and/or model number of the toy 290. The single software variable may be read from the toy 290 by means of its physical and/or electronic connection to the TICD 210, where the variable value may be used by the Master Application module 220 to activate one or more specific programs and/or subroutines which are written for controlling the toy 290 and/or the class of toys it belongs to. In this embodiment, there may or may not be any Global Behaviors and Functions 230 utilized, and/or those functions are written directly as part of the software routines running within the Master Application module 220. In this model, the core capability and functionality of the TICD 210 to connect to, communicate with and/or control different devices 290, with the facility to adapt its operation to each different device 290 being maintained.

In addition to the modules illustrated above in FIG. 2, the TICD 210 may also support operational functions integrated into its own hardware design. These operational functions are beneficial to be run on the TICD 210 itself as part of a common feature set, rather than relying on other devices for access to those functions. In some cases, the TICD 210 may also have direct access to hardware on a device 290 without the need of going through the communication bus, depending on the optimal setting for those specific products and/or applications. In one embodiment, a TICD 210 may include direct electronic outputs that may power and operate other mechanisms within a device, such as motors. This instance may be useful in cases where the cost of the devices are designed to be as low cost as possible, such as with a line of toys, and the toys are not differentiated enough in function to justify the added cost of implementing the cross product bus. In some embodiments, the TICD 210 may have the components and/or connections needed to directly control the motors within each toy to perform the specific functions, where the Master Application module 220 still adapts it operation to the individual toy. This may be implemented where the TICD 210 maintains support for the cross product bus for interfacing with other devices, or for a feature reduced version of the TICD, such as one only designed to support a certain line of toys, the cross product bus may not be included in the TICD hardware.

Figure 3:
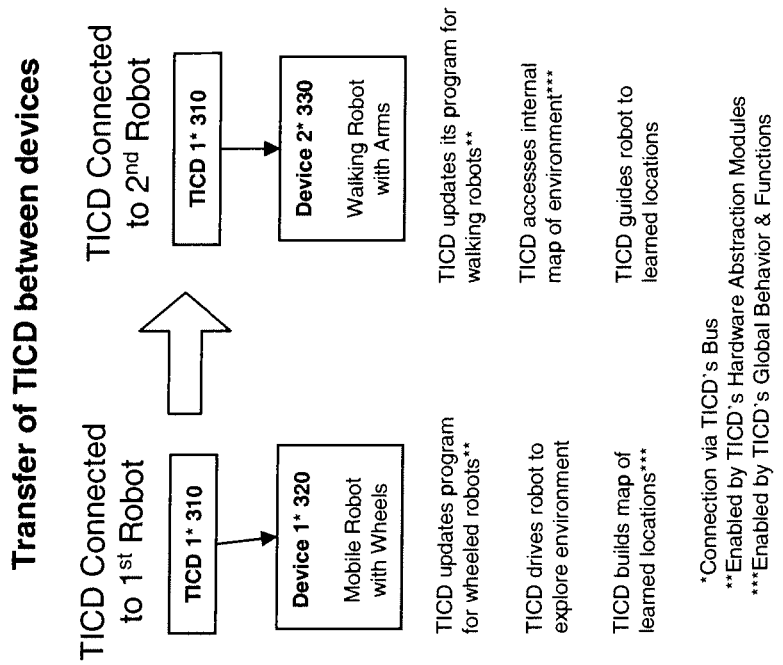
FIG. 3 illustrates removing a Transferable Intelligent Control Device (TICD) from one device and connecting the TICD to another device according to an embodiment of the invention.

FIG. 3 illustrates removing a TICD from one device and connecting the TICD to another device according to an embodiment of the invention. The TICD system 300 design enables direct transferability of behaviors, capabilities and learning from one device 320 to another device 330, as is illustrated by FIG. 3. Information and learning acquired by the TICD 310 while operating on one device 320 is maintained in the TICD 310 within the Global Behaviors and Functions module 230 (see FIG. 2), and can be used on other devices (e.g., device 330) through the use of the Hardware Abstraction Modules 240 (see FIG. 2) and Bus Control Module 275 (see FIG. 2). The Hardware Abstraction Module(s) 240 adapts the functions of the Master Application module 220 so the desired behaviors are output as commands that the target device 330 can recognize and perform. An exemplary system and method for implementing a Hardware Abstraction Layer in taught in U.S. Pat. No. 6,889,118, which is hereby incorporated by reference herein.

FIG. 3 illustrates that the TICD 310 is initially connected to a first device 320, which is a mobile robot having wheels. The TICD 310 is connected to the first device 320 utilizing the cross-product bus 277 (see FIG. 2). The TICD 310 updates its programming, commands and/or operations to be compatible with the first device 320 (wheeled robot,) and other wheeled robots with a similar configuration and/or movement capabilities. The updating of the programs may be accomplished via the Hardware Abstraction Module 240 (see FIG. 2). The updating may occur because the first device has never been connected to the TICD 310 before or it may occur because the device has different programs from what the TICD 310 has encountered before (wheeled robots' functions). After the updating of the TICD program, the TICD 310 may transmit commands to cause the first device to explore the environment in which the first device 320 is located. As the first device 320 is exploring the environment, the TICD 310 is building maps or virtual representations for the explored location. The building of maps or virtual representations is implemented by the Global Behavior and Functions module 230 (see FIG. 2) where information gathered from the sensors in the TICD 310 and/or sensors on the wheeled robot 320 is abstracted and stored into a representation of the environment explored. In FIG. 3, the TICD 310 is connected to the second device 330 (which is a walking robot with arms). The TICD 310 is connected to the second device 330 via the cross product bus 277.

After connection to the second device 330, the TICD 310, through the Hardware Abstraction Module 240, updates its program for walking robots. The TICD 310, through the Global Behaviors and Functions module 230, accesses the map (or virtual representation) for the common environment where the first device 320 and the second device 330 are located. The TICD 310 then provides instructions, which are converted into commands, to guide the second device 330 (i.e., second robot) to or through the learned locations.

In embodiments of the invention, transfer of knowledge and behaviors can also occur between two or more TICD units, through sharing of information. In these embodiments, instead of physically removing a TICD from one device and attaching it to another device, as is illustrated in FIG. 3, pertinent resources in a Global Behavior and Functions Module 230 can be downloaded or transferred from one TICD to another. The communications can occur by (1) connecting one TICD to another TICD directly via the communication bus; (2) connecting one TICD to another through intermediary link, such as via USB, WiFi or other protocol; and/or 3) uploading the relevant resources or information from one TICD to a storage device (e.g., local memory, flash drive, hard disk drive, CD/DVD) and downloading the resources to the new TICD.

In an embodiment, all or some of the TICD software modules may be transferred from one TICD to another TICD. As an example, the Master Control application 220 (see FIG. 2) may be transferred along with the Global Behaviors and Function Module 230 (see FIG. 2), and/or the Hardware Abstraction Module 240 (see FIG. 2) based on the required operation of the second TICD and it's attached device.

In an embodiment, information and software from one TICD may be transferred directly into a electronic device where the device has the TICD hardware directly integrated as part of the internal electronics of the device (or has alternative hardware/software platform compatible with operating the TICD software architecture and modules) as opposed to having those electronics be in the form an external detachable module. In this example, transferability would extend to include TICD to a TICD software compatible device, TICD software compatible device to another TICD software compatible device, and/or TICD software compatible device to a TICD.

Because the Global Behaviors and Function Module 230 (see FIG. 2) is independent of the Hardware Abstract Module(s) 240 (see FIG. 2), the transfer from TICD to TICD functions may occur in cases where the TICD units are connected to the same type of device, as well as in cases where the TICD units are connected to different types of devices.

As noted before, the TICD 310 may interface with and control the behavior of a broad variety of different devices through the use of device-independent and/or device dependent commands through the cross product bus as supported by the Hardware Abstraction modules. In order for the devices (e.g., robots 320 and 330 of FIG. 3) to fully execute the desired behaviors intended by TICD 310, interfaces these devices may execute additional operations, functions, and/or lower level behaviors specific to their individual design, hardware and function as part of the process of completing the behavior directed by the TICD 310. Examples of the operations specific to each device include, but are not limited to: translating commands received by the TICD 310 into a set of discrete functions and actions to perform, managing the power system for the device; driving motors and other actuators, controlling outputs integrated into the unit such as lights, sound devices and displays, monitoring sensors and feedback mechanisms connected with the device, receiving input from other wired and wireless devices, buttons and radio frequency remote controls, running software, and performing behaviors that allow the unit to operate when the TICD 310 is not connected to the devices 320 and 310. Some of all of the above operations may also function when the TICD 310 is not connected and/or when the TICD is not sending commands, to provide minimal system functions.

Figure 4:
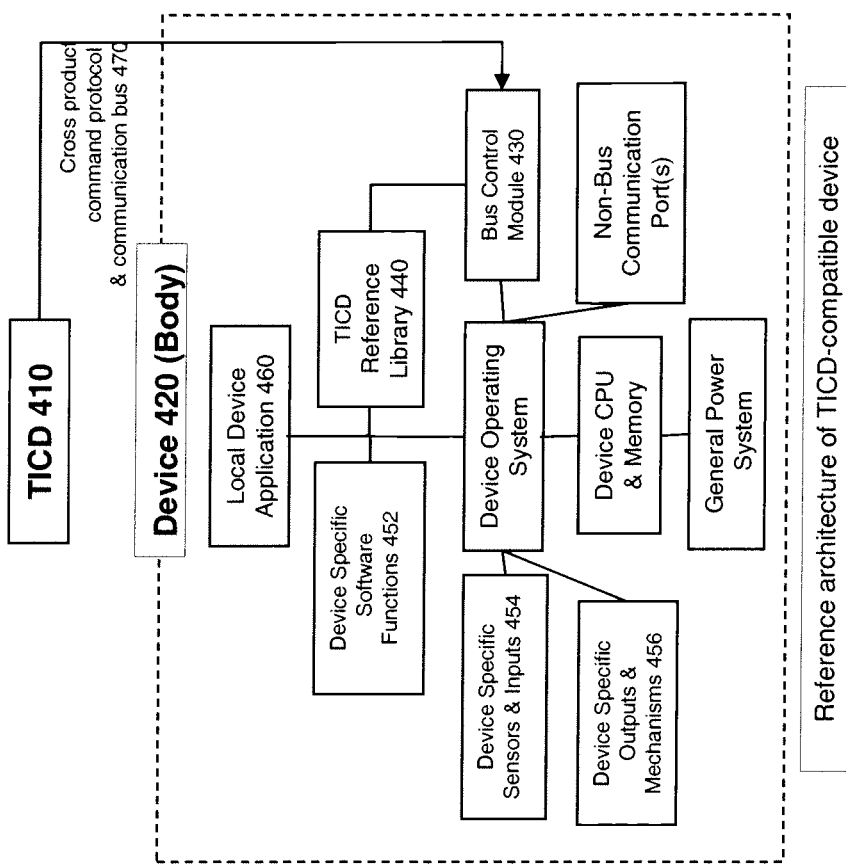
FIG. 4 illustrates a body of a device that is coupled or connected to a Transferable Intelligent Control Device (TICD) according to an embodiment of the invention.

FIG. 4 illustrates a body of a device that is coupled or connected to a TICD according to an embodiment of the invention. FIG. 4 provides a reference design, as to the type of components or modules that are in a device that can connect to the TICD 410. Each device 420 does not require that all of the illustrated modules are included in order for the device 420 to be connected to the TICD 410. The number of modules required depends on a range of the functions available or implemented by the device 420. For example, if a sensor is a device, a sensor has a limited scope of functions as compared to a wheeled robot device.

Key modules that are included in the device 420 to allow successful control of the device 420 by the TICD include a bus control module 430, a TICD reference library 440, a device specific software functions module 452, device specific sensors and inputs 454, device specific outputs and mechanisms 456, and local device application modules 462 464 466.

The Bus Control Module 430 includes a device connection point for interfacing the TICD's cross product bus 277 (see FIG. 2), where the TICD 410 is the master device on the TICD cross product bus 277.

The TICD Reference Library 440 allocates memory for use by the TICD 410, in order for the TICD to recognize the device 420 to which it is being connected. The TICD Reference Library 440 also allocates memory, if needed, to read or upload data, settings, commands, routines, programs to the TICD's Hardware Abstraction Module 240 (see FIG. 2).

Device Specific Modules 452 454 456 provide the supporting systems, routines and/or interfaces to hardware that enable the devices' 420 behaviors and functions. The device specific function modules 452 454 456 provide open parameters and data feedback. The data feedback can be used to adjust the device's behaviors, recognize events detected, gather states measured by the device. Examples of the device specific function modules are: (1) device specific software functions 452, which provide any supporting routines, resources and/or data for the Local Device Application 460 to perform its task, such as a driver for a particular sensor, and data table the maintains the state of the system, a timer that is use to schedule tasks and set time-outs for operations that have past their maximum time limit to complete; (2) the device specific sensors and inputs 454, such as a bump sensor for detecting obstacles, a wheel position sensor for measuring the distance traveled by the a wheeled robot, a radio frequency receiver (and/or other wireless receiver), input from an attached/connected device, and/or user interface buttons located on the device; (3) the device specific outputs and mechanisms 456, such as motors that control mechanisms in the device, sound output, visible display output; and output to an attached/connected device.

The Local Device Application Module 460 provides overall control of all functions in the device 420, and coordinates intermediary control over the device when the TICD 410 is connected to the device 420. The local device application module 460 may support multiple modes of operation, including providing base-level functions for stand-alone operation when the TICD 410 is not connected to the device 420. For example, the local device application 460 may enable a remote control car to be operated via commands that are received from a radio frequency remote control unit, by monitoring signals received by a radio frequency receiver connected to the hardware of the device and converting those signals into commands for the motors to execute as behaviors of the car. The Local Device Application module 460 generally maintains control over lower level functions in the device 420. Under certain operating conditions, the local device application 460 may over-ride commands from the TICD 410 in certain circumstances, such as if a safety sensor detects that the robot is about to drive over stairs, and over-rides and ignores commands sent by the TICD 410 instructing the robot to continue traveling forward.

As an example of an embodiment, in the car race game scenario described earlier, the device's architecture supports the remaining hardware, software and mechanical functions to complete the full brain-body system (i.e., the TICD and race car) and perform integrated behavior. The following example describes the role of device components as part of the racing game scenario. This example is not limiting in that it is directed to this particular scenario and other scenarios/configurations exist and thus other supporting functions may be added or deleted for these other scenarios and configurations. The applications and supporting functions within the race care device architecture are described below.

In the racing game example, the Master Application 220 on the TICD 210 may determine which commands are sent to the device through the communication bus (or cross product bus) 277. Commands sent from the TICD 210 to the device 420 can be received through the device's 420 Bus Control Module 430 based on the device's ID. After receipt of the commands, the commands are relayed to the Local Device Application Module 460, which can coordinate the execution of the commands by the device 420 in conjunction with the other functions running on the device 420. The Local Device Application module 460 processes the commands and perform the requested actions through the Device Specific Functions Modules 452 454 456. The functions in the Device Specific Functions Module may include but are not limited to: (1) low level commands to the motors to drive the car in the intended direction; (2) commands to provide data feedback to the TICD on the state of relevant systems, such as the voltage levels and/or other indicators which provide information on the power being applied by the motors; (3) commands related to device specific systems, such as pulsing of the motors to control speed, implementing a breaking routine, and/or (4) other device specific functions.

In this scenario, the TICD reference library 440 on the device provides the information, resources and/or directions for the TICD 420 to update its Hardware Abstraction Modules 240 in order to properly interface and control the device 420. An initial update may occur when the TICD 410 is first connected to the device 420. The initial update transfers data which establishes the core command set, routines, settings and resources for interfacing with the devices in the TICD's Hardware Abstraction Modules 240. The data in the TICD reference library parallels the data that can be utilized by the Hardware Abstraction modules 240, which may include as described earlier: (1) an identification of the device, which can include a general classification for devices that share common traits (e.g., mobile robot type 2), a specific model of a device, and/or a specific device unit number (e.g., for use in differentiating similar units and/or retrieving relevant historical information); (2) a physical description of the device 290 and the device's key components; (3) a database of the inputs, outputs and functions available on a specific device 290; (4) a mapping of commands for accessing those inputs, outputs and functions of the device 290; and/or (5) any supporting resources such as parameters, description files, settings and/or routines that enable the TICD 210 to perform integrated behaviors using the connected device or device, and/or (6) links and/or directions to external network locations that provide access to any supporting drivers, software programs, data and/or any part the resources identified in items (1) to (5).

In some embodiments of the invention, a generic set of commands and resources may be utilized by the TICD 410 to control the devices 420 without the need for an initial update. Additional updates for the TICD 410 can be implemented based on need. The additional updates may occur when the TICD 410 requires additional functionality or access, when a new device is added to the cross product bus and has impacted the operation of the TICD 410, and when a new device is added to the cross product bus 277 and has impacted the initial device 420. The additional updates may also occur based on external conditions of usage, changes in the environment and/or other factors.

To maintain its hardware independence, the TICD 410 interfaces with different supported devices through the cross product bus 470 as described earlier, which interfaces with the device by communicating with the devices Bus Control Module 430. The cross product bus enables the TICD 410 to send commands to a specific device based on its unique ID, receive back information from the device and perform operations as one integrated system. The Bus Control Module 430 is responsible for accepting the commands issue to it based on its ID, passing on the command for the Local Device Application module 460 to interpret and execute, and relaying back any information requested by the TICD through the cross product bus 470. This architecture provides the TICD 410 complete access to the device's functions, without requiring any changes to the TICD's 410 core hardware and system design.

The system architecture enables the TICD 410 to interface to one or more compatible devices at a time over the cross product bus 470. In the case of multiple devices being on the cross product bus 477, the TICD 410 provides the central link between the devices to ensure system-wide communication and coordinated control of all connected devices through the device IDs.

The system is designed to be flexible and allows the TICD 410 and/or other devices to update the Device Specific Functions Module 452 454 456, the Local Device Application Module 460, the Bus Control Module 430 and/or the TICD Reference Library 440 to incorporate new features and/or capabilities. In one embodiment, the TCID 410 may be able to reprogram part or all of the software modules with the Device 420. This method may be used to update the Device 420 with new capabilities, update the Device 420 to be able to communicate with updated versions of the communication protocol utilized by the cross product bus 470, update the Device 420 to be able to respond to recognize and respond to new commands sent by the TICD 410, and/or enable the Device 420 to take on additional functions that in some cases were handled by the TICD 410.

The TICD Reference Library 440 provides a key function in enabling compatibility across devices. Among other information, it holds a device's initial ID and description. When the TICD 410 is first connected, the device 420, through the TICD Reference Library 440 and cross product bus 470, returns the device's ID to the TICD 410. This device ID lets a specific TICD 410 know if it has worked with this specific device before (because the TICD 410 will have a record of the device ID). If the TICD has worked with this specific device before, the TICD 410 determines what, if any, updates that needs to be made to the Hardware Abstraction Modules 240 within the TICD 410 to correctly interface with the all of the device's 420 available functions.

If an update is required, the update process may work in a number of different ways depending upon the user requirements and logistic considerations for the companies who are manufacturing the intelligent devices. In some cases, the TICD Reference Library 440 may provide all the information needed to update the Hardware Abstraction Modules 240 within the TICD 410. The information in the TICD Reference Library 440 may include any combination of the following elements: (1) new settings for default commands; (2) configuration files; (3) new commands and functions specific to the device; and (4) new software routines and programs for the TICD's Master Application 320 to access.

For some devices, it is not economical or practical for the intelligent device to store all of this information in the TICD Reference Library 440. One example is a low cost intelligent toy. In cases where the information that is normally stored in the TICD Reference Library 440, but the intelligent device can not afford to store all of the information itself (due to cost or space requirements), the TICD Reference Library 430 can have a minimal set of information. Remaining parts of the configuration data may be provided on separate media shipped with the device (such as a CD-ROM, DVD or memory card) or may be available as a download from the Internet. Under certain operating conditions, a URL for a download may be embedded in the TICD Reference Library 440 When the TICD 410 is connected to the Internet for updates, the TICD Reference Library 440 may be used to prompt for a download groups of intelligent devices may share some common traits or may utilize generic commands. When the groups of intelligent devices have common traits, the TICD Reference Library 440 may be small in size and may not require significant changes to the TICD's software or settings. When the groups of intelligent devices utilize generic commands, the TICD Reference Library 440 may also be small in size.

The TICD 410 may also have the ability to autonomously adapt its programming, behaviors and/or settings to new or unknown intelligent devices through self-learning behaviors. In these embodiments of the invention, the TICD 410 may perform a series of actions and commands with a new device. The TICD 410 may monitor the outcome of the series of these actions to determine where modifications are needed to programming, behaviors and settings. The device self-learning may be part of a formal self-diagnostic routine, or may be performed as a background task as the intelligent device is performing its designed tasks. These learning functions may be performed by the Global Behavior and Functions modules 230 as a system utility, where the information learned may be used to update information in the Hardware Abstraction module to optimize the settings, commands, functions, routines and/or other data used in conjunction with the specific device 420. This information may also be saved back down into the TICD Reference Library for the device 420 to update its own settings where applicable.

This adaptability may also be applied to known intelligent devices where settings, performance characteristics and/or environmental conditions have changed that result in a change in the total system behavior. Examples may include, but are not limited to (1) an intelligent device where power changes are impacting the function of motors or actuators, (2) instances where the intelligent device or its configuration has been modified by an action, such as adding weight; or (3) cases when the device is operating in a different setting that causes physical changes in its behavior, such as losing traction on a smooth floor.

An example of learning may include having the TICD 410 periodically test the drive system of a wheeled robot 420 to which it is attached. The robot's electro-mechanical drive system may develop variances in performance over time, which change how it moves the robot in response to commands from the TICD 410, for example by having a tendency to drift to the left when driving forward. The TICD 410 may be able to detect this drift, and adjust the drive commands sent by the TICD 410 to compensate, and/or modify a lower level device output function 456 within the robot 420.

The implementation of the TICD 410 may also be adjusted based on the different product applications. Examples of variations in the TICD 410 implementation include, but are not limited to: (1) embodiments where the TICD 410 is built into a product as part of the embedded electronics, due to cost and/or design considerations; (2) embodiments where the functions of the TICD 410 are modified, e.g., either reduced or expanded, to be adapted for a specific use; (3) different embodiments of the TICD 410 for different product categories or applications.

In embodiments where the TICD is built into a product, the TICD would not have the physical portability it would have as a self-contained device, but features of the TICD's system can still benefit the product. These features include the ability for the product to interface with external sensors and accessories compatible with the TICD 410. This is assuming that the product allows external devices to have access to the TICD's communication bus. The product may also benefit from updates to its Global Behaviors and Functions Module from other devices, such as in transforming knowledge of the environment to the product, or expanding the range of capabilities of the product.

In cases where the TICD 410 is modified, certain features of the TICD 410 may be dropped, but as with the case of the built-in TICD 410 embodiment, certain features and systems of the TICD may still be active and beneficial. Illustratively, one potential modification maybe to use direct input and output to control specific hardware, such as providing the power electronics and ports needed to directly control motors rather than through the communication bus 277 and local device electronics. This specific modification may be of particular use for low costs devices, where minimizing the infrastructure of electronics on the device minimizes the product costs. These modifications may not impact other functions of the TICD 410, and can be implemented in a parallel fashion where the TICD 410 serves both device independent and device dependent functions.

For a final point of different classes of the TICD 410, some product applications may have much more robust performance requirements than others, such as higher-end entertainment robot or a telepresence robot that need to process video and stream high bandwidth streams of data across the system. The core TICD 410 architecture may be applicable, but the application requirements may require a much faster communication bus 470 or level of processing internally performed by the TICD 410. For these instances, the TICD architecture may be optimized to support a new class of devices. Some functions and modules may be maintained if these functions or modules are needed to support access to external components as well as still be able to share core behaviors and learning common to all of the devices.

FIG. 5 illustrates a TICD and an intelligent toy according to an embodiment of the invention. The intelligent toy system includes an intelligent toy 510 and a TICD 520. In this embodiment of the invention, the TICD 520 includes a TICD Board 525 and the TICD Board includes a CPU, a memory & and a Device I/O. The TICD 520 also includes a external communications port 533, a positioning sensor 550, a power supply 545, and a user interface module 547. The TICD 520 is connected to the remote control toy 510 via the cross product bus 555, which in this embodiment is the 12C bus, which does include a power signal. The cross product bus 555 also allows connection or coupling to extension modules and additional sensors 560.

The TICD 520 utilizes the external communications port 533 to communicate with other devices. These communications may occur utilizing the external devices' protocols. The TICD 520 may also include a positioning sensor 550 which detects signals from devices that are emitting positioning signals. In an embodiment of the invention, the positioning sensor 550 micro-gps and radar functionality. In an embodiment of the invention, the positioning sensor 550 may include an embedded version of Evolution Robotics vSLAM system. The power supply 545 may provide power for the external communications port 533 and for the TICD control board 525.

In an embodiment of the invention, the TICD control board 525 may have different form factors (e.g., a cheaper version for a toy and a more expensive version for appliances). In embodiments of the invention, the different classes of robotic devices may require TICD control boards with different functions built into the TICD control board 525. For example, there can be one TICD control board 525 for intelligent toys, a TICD control board 525 for home automation, and a TICD control board 525 for industrial robots. The three different classes of TICD control boards 525 would not be compatible with each other, but would be compatible within the class of compatible devices (e.g., intelligent toys, home automation, and industrial robots).

Illustratively, one TICD 520 may include a TICD control board 525 with a Northstar navigation system built-in. An alternative TICD 520 may include a TICD control board 525 with a navigation system built-in and a camera with a vision recognition system also built-in. In another embodiment, the CPU on the TICD control board may be a dual processor or a graphics-enhanced processor to assist with specific functionality required by the TICD 520.

In other embodiments of the invention, the TICD control board 525 may have different levels of functionality. A first level TICD control board 525 may provide essential functions for the lowest common denominator of products. Illustratively, the first level TICD control board 525 may include a random navigation module which uses basic obstacle detection and sensor. The second level TICD control board may include an enhanced navigation module built-in, e.g., Evolution Robotics Northstar navigation. The second level TICD control board can fully operate all of the functions for the vacuum cleaner and provide for smart, systematic cleaning where the TICD 520 controls the driving behaviors and tracks position to provide even and efficient cleaning coverage of the room.

The intelligent toy 510 includes an RF receiver 570, a power supply 580, and a toy controller board 575, which includes a CPU, a memory and an I/O device. The toy controller board 575 is also connected to a motor1 572, a motor2 573 and a speaker 577.

The RF receiver 570 receives command from a remote control (operated by a user) and passes these commands to the toy controller board 575 to be executed by the CPU. The CPU executes these commands, which causes the toy controller board 575 to send signals (or instructions) to the motor1 572, motor2 573 and or the speaker 577. For example, the commands may represent instructions to turn right and make a honking sound. The CPU receives and executes these commands and causes the toy controller board to send driving signals to motor1 572 which causes the toy to turn to the right and driving signal to the speaker 577 to make an audible sound. The power supply may provide power for the toy controller board 575 and the RF receiver 570.

The toy controller board 575 may be custom designed for a specific toy, i.e., a doll would have a specific toy controller board and a remote controlled car would have a specific toy controller board. Each of the toy controller boards may include a compatible connection port that supports hardware communication with the TICD 520. This connection port may be hardwired. The connection port may also be utilized via wireless communication protocols. The toy controller boards also may include a microprocessor and a memory system, which run the software communication protocol to talk with the TICD 520 and accept commands and provide data back when needed.

When the TICD 520 is used, the TICD 520 controls the intelligent toy 520, but the toy controller board 525 performs all of the tasks commanded or transmitted by the TICD 520. In embodiments of the invention, a reference design and a set of hardware and software requirements would be provided for compatibility with the TICD 520 and the intelligent toy manufacturers may incorporate a specific design that meets the requirements into their devices.

The cross product bus 555 also allows connection or coupling to extension modules and additional sensors 560. The extension modules and sensors are peripherals to the system may be accessed by the TICD 520. Illustratively, if a basic intelligent toy is connected to a TICD, a proximity/distance sensor, a smart camera, an extra robotic arm, and a communications device (e.g., Bluetooth module) may be added to add new functionality. Expandability of the system is supported by the communication bus. In embodiments of the invention, the TICD is not limited to connecting to only one device at a time. The TICD 520 may integrate multiple devices and coordinate these devices into an organized system. For example, a TICD 520 may plug into a car and drive the car. If a mobile phone is in the car and it has Bluetooth, the phone may then call the TICD through the phone and tell the TICD where to drive the car.

The TICD can be used in connection with a variety of products and applications. The following products and/or applications are illustrative examples, but the TICD implementation is not limited to these described examples.

One application may be a robotic game platform. For the robotic game platform, the TICD serves as a core platform for enabling users to play games and/or run other entertainment applications with different robots, toys, game systems, portable game devices, mobile phones, other hand-held devices and/or other robotic-enabled devices. In each of these game or entertainment applications, the TICD provides key intelligent functions, capabilities, and/or behaviors required for the game and/or play experiences. The TICD executes those functions, capabilities and/or behaviors through the attached product or products.

Examples of games that may utilize the TICD include, but are not limited to robotic vehicle games such as racing, chasing, running obstacle courses, performing jumps and/or stunts, demolition derbies, driving in formations, and/or other vehicle related games. Another example of games that may utilize the TICD are battle robots that compete with other robots, objects, targets, human players and/or virtual players or objects. The battle robots compete utilizing physical contact, launching of projectiles, targeting utilizing light, sound, and/or through virtual weapons and/or targeting devices. Additional examples of games that may utilize the TICD are: (1) robotic sports players that play one or more sports such as hockey, soccer, football, sumo wrestling and/or other sports games; (2) robotic players that play traditional children's games such as tag, follow the leader, capture the flag, king of the hill, keep away, and/or other games; (3) robotic players that play and/or represent game objects from classic video games, such as arcade games similar to Pong®, Space Invaders®, PacMac®, and/or other games; (4) robotic players that play and/or represent game objects from current genre of video games, such as first person shooting games, strategy games, turn-based games, adventure games, puzzle games, simulation games, and/or other games from different genres; (5) robotic players that play and/or represent objects from board such as checkers, chess, and/or branded board and prop games (e.g., Monopoly®, BattleShip®, Statego®, etc.); and/or (6) any new games developed by third parties and/or end users, where the TICD provides a general platform for creating new games with new software programs for the TICD that function with existing compatible devices, as well as through development of new software and hardware devices to represent new games.

As one example of the robotic game platforms, the TICD may hold one or more game programs for use with a number of electronic toy cars to enable vehicle based games. When the TICD is connected to a specific car, the two products become an integrated system, where the TICD may control the behavior of the connected car, and through its sensors, track the location and/or other information about the second car, and/or send command to remotely control the second car. The integrated system, including the TICD, allows the car to play games with a user and also to perform other autonomous and/or semi-autonomous functions. If a number of game programs are loaded in the TICD, a specific game may be selected from the one or more game programs available to the TICD. In embodiments of the invention, the games may be stored on the TICD itself and/or may be available through a connection with another devices and/or storage media. Illustratively, an illustrative game program may be car racing against other autonomous, semi-autonomous and/or remote controlled cars along a race course. In these car racing games, the TICD utilizes sensory systems, application software, processing capabilities, supporting routines and communication interfaces to drive the car autonomously.

In these car racing games, the TICD may perform functions including but not limited to: (1) determining the layout of the course; (2) keeping the car on the course; (3) tracking the position of the car; (4) tracking the position of the other cars in the race; (5) interfacing with commands from a user or other device; (6) interacting with other game objects, such as beacons, tags, props and/or other physical and/or virtual elements of the game; and (7) executing behaviors and strategies in attempt to win the race. The TICD can additionally support the game with functions that include but are not limited to: (8) tracking results; (9) allowing the adjustment of car performance settings (e.g., top speed, acceleration, virtual fuel burn, etc.); (10) allowing the changing of virtual drivers and/or adjust driver tactics (e.g., aggressive vs. conservative driving style); (11) adjusting behaviors to increase or decrease the game difficulty levels based on the users' settings, programmed game settings and/or the different players performance; and/or (12) adjusting other game parameters.

In one embodiment, the TICD may utilize a sensor that tracks the location of the other car and/or other game objects that include a positioning beacon. This sensor may be part of the TICD itself, functioning as part of the Primary Sensors module 255. The Global Behaviors and Functions module 230 may provide behaviors that utilize the sensor to for tasks such as chasing the other care, following a course, keeping track of the car within the course, tracking the position of multiple game objects, and employing navigation tactics to win the race, along with modules for keeping score, adjusting performance characteristics of the car and/or game difficulty. The Master Application module 220 may control the overall game play, rules, user settings that make up a specific game session, and directs the moment to moment behaviors of the car as a real world computer game opponent. The Hardware Abstraction modules 240 may provide any routines, settings and/or information needed to adjust the behaviors to the configuration and performance characteristics of the car, enabling the Master Application to issue commands through the cross product bus 277 that control the cars 290 actions.

The TICD may also include different game programs for the same vehicle. These game programs include, but are not limited to: (1) enabling the car to chase other cars; (2) enabling the car to perform stunts; (3) enabling the car to battle other cars; (4) enabling the car to navigate autonomously in obstacle courses and/or real word settings; (5) enabling the car to pick up and/or drop off objects, and/or (6) enabling the car to perform a variety of other vehicle-based games and/or functions.

In embodiments of the invention, the TICD may be attached to other remote controlled cars, robots, toys, robotic devices and/or non-robotic devices in order to initiate games, functions, capabilities and/or behaviors with the products to which the TICD is connected. Any learning, information, functions, capabilities and/or behaviors acquired from prior games with prior products and/or user sessions may retained within the TICD and thus via the Global Behaviors and Functions module 230 in FIG. 2, transferred to the new products to which the TICD is connected and used in conjunction with these other products and/or devices.

In some embodiments of the invention, the TICD can be used independent of any other robotic device. The TICD may be used by itself as its own hand-held game device. The TICD may allow the playing of games stored within the TICD. Illustratively, the games may be played using external props. The games may also be played utilizing game functions embedded within the TICD itself, through the use of button, lights, sounds, displays, sensors, communication systems and/or other interface devices that are installed on or within the TICD.

In embodiments of the invention, the TICD may be paired with an existing game platform and/or device to provide additional functionality to the existing game platform and/or device (120 in FIG. 1) through a platform specific communication link. In one embodiment of the invention, the TICD can be disconnected from a robotic car and then connected to a video game platform. The video game platform may display a virtual replay of a race completed by the robotic car as well as summarizing the results.

In an embodiment of the invention, the TICD may be used as an alternative input device for the game platform. If the TICD is used as the alternative input device, the TICD allows the game platform to access the TICD's sensors, interfaces, functions, capabilities and behaviors to expand the game environment of the game platform to the real world. In this embodiment, the TICD can detect objects and/events in the real world environment with its sensors and translate that as input to the game platform. Illustratively, in the car racing game, the TICD can track the positions of cars on the actual race course and the video game platform shows a representation of the race on its display screen while the action occurs in the real world, i.e., in real time.

Users can also update the games, routines, functions, capabilities, behaviors, settings and/or other information on the TICD to expand the range of play scenarios. The updating allows the TICD to interface with a broader range of products. The TICD may be updated by a number of methods including, but not limited to: (1) downloading games and/or other updates from a computer, game system, Internet service, television, media player, mobile phone, other handheld device; (2) sharing games and/or other updates between TICD units via wireless connection, wired connection, and/or through an intermediary device with can transfer data; (3) updating games and/or settings through memory stored on the connected product, through memory stored on separate media or memory device; or/and any combination there of.

Information may be shared between TICD units and/or other intermediate or supporting devices. The information shared between TICD units may include, but is not limited to: (1) specific routines, functions, capabilities and/or behaviors; (2) performance data and/or game results; (3) learned and/or adapted techniques from prior game play; (4) information regard the users' environments and traits; (5) game data that enables another device or product to replay a representation of the game, a specific player's actions and/or behavior used in the game; or (6) any other information that can be useful to enriching the game experience.

In one illustrative example, the TICD can be placed on a remote controlled toy car. The integrated TICD and car system drives around an environment which teaches the TICD the course. A user may direct the driving around the environment. The TICD is detached and then connected to another electronic toy car. The other electronic toy car, with which the TICD is interfaced, and has the TICD drive the car along the course which was previously taught to the TICD.

In another illustrative example, the TICD is taught the race course by a user holding the TICD as the user (and thus the TICD) moves through an outline of the course. The TICD may also be placed at key waypoints along the course in order to gather additional information. Additional embodiments may include, but are not limited to: (1) selecting preprogrammed courses available on the TICD and/or from another device; (2) programming the course through the use of a course editor application on the TICD and/or other device; (3) selecting a set of rules and/or behaviors that define the course; (4) adjusting physical objects and/or props that define the course; and/or any combination thereof.

Users, application developers, content providers and other $3^{rd}$ parties can also provide tools, information, programs, routines, functions, capabilities, behaviors and/or other content that can be transferred into the TICD through a variety of digital and physical methods to expand the range of TICD uses and/or enhance the TICD's performance.

The TICD may also be utilized in electronic appliances. The TICD can be attached to a variety of electronic appliances and/or related products to enable autonomous, semi-autonomous and/or other robotic-enabled functions, capabilities and/or behaviors. There are a number of different embodiments of the invention and the invention is not limited to the embodiments discussed herein. One illustrative example is the TICD being utilized as a central control system for a variety of mobile appliance robots and related products. For example, a number of mobile appliance robots may be a robot vacuum cleaner, a robot mop, a robot sweeper and a robot security device. One product may be a robotic vacuum cleaner and the TICD connects to the vacuum cleaner. The TICD may autonomously or semi-autonomously drive and operate the robotic vacuum cleaner within the user's home, office, place of business or other location. The TICD may learn the user's environment, navigate the robotic vacuum cleaner from location to location using the navigation module, perform cleaning functions, utilize systematic and/or random cleaning patterns as needed and/or as directed by the user, optimize its cleaning patterns for the environment, keep track of areas cleaned, and avoid obstacles and/or other off-limit areas. The TICD also enables self-docking, interfaces with users, interfaces with other products, and/or perform or enable other functions, such as tracking performance information, updating maintenance files on the vacuum cleaners operation, and tracking information regarding the condition of the floors.

After the robotic vacuum cleaner is finished, the TICD may be detached from the robotic vacuum cleaner and attached to other robotic vacuum cleaners or other floor cleaning appliances, such as a robotic floor sweeper, a robotic mop, and/or other intelligent device. No matter what device the TICD is attached to, the TICD retains key programs, routines, information, learning, functions, capabilities and/or behaviors and transfers these to the new product to which the TICD is attached. Illustratively, a new robotic vacuum cleaner may be purchased as a replacement for the prior robotic vacuum cleaner, and the TICD from the prior unit may be placed on the new robotic vacuum cleaner. With the connection of the TICD to the new robotic vacuum cleaner, the TICD operates the new robotic vacuum cleaner which has access to all of the information regarding the specific previous environment, cleaning preferences of prior users of the original robotic vacuum cleaner, selected programs, adapted behaviors and/or other resources.

The TICD may also be utilized to control functions for different types of electronic appliance products. In other words, relevant information may be gathered and utilized across products in a product lines. In one illustrative embodiment, the TICD is attached to a manually controlled vacuum cleaner by a user and the TICD uses a localization system to track where the user cleans, identify preferred cleaning patterns, identify where dirt or high traffic areas exist, and/or determine any other relevant information. After the TICD has been removed from the manually controlled vacuum cleaner, the TICD is attached to a robotic vacuum cleaner and/or other floor care product. The TICD and robotic vacuum cleaner will then clean where the TICD and manually controlled vacuum cleaner cleaned by following the user's patterns or preferences. The TICD and robotic vacuum cleaner may place focus on cleaning historically high traffic areas, and/or implementing any other behaviors tied to information gathered. Similarly, the TICD, by itself, may be walked through an environment, by a user, to indicate where a cleaning device is expected to travel and clean. The TICD tracks the locations via its localization system. The TICD may also accept user input to mark specific areas for a desired type of cleaning.

In another embodiment of the invention, the TICD can be attached to a security robot, a telepresence robot, a delivery robot and/or other mobile robot. The TICD can learn the environment or other operational information which is retained within the TICD and then passed across from product to product. As an illustrative embodiment of many potential embodiments, the TICD can learn the layout of a home, office, place of business or other location from the use on one appliance, such as a robotic vacuum cleaner, and than employ that layout on a mobile security robotic which patrols the environment.

As is the case with the robotic game application, one TICD does not have to be physically connected with each product to enable the transfer of programs, information, learning, functions, capabilities, behaviors and/or other resources. One TICD can share programs, information, learning, functions, capabilities, behaviors and/or other resources from another TICD, such as a map of an environment, via any means for digital information transfer.

Also, the TICD may incorporate information transferred from other devices, without the need for a separate TICD to provide a direct connection. As one illustrative embodiment of many potential embodiments, information regarding localization is captured from a specific system via a device, such as a localization sensor embedded onto a manually controlled vacuum cleaner. This information can be exported and transferred to the TICD as data file. The TICD may receive the data file and the TICD translates the data into a form it can internally use. This may be a device-independent form.

All of the methods described in the robotic games applications for updating games, settings and/or other information for the TICD may likewise be used as possible methods for updating applications, settings and/or other information for appliance-based uses of the TICD, and/or other product applications of the TICD.

The TICD may be used in any product and/or use scenario which benefits from having a transferable, core intelligent device that interfaces with one or more other products. Additional scenarios include, but are not limited to: (1) government applications; (2) military/defense applications; (3) security/monitoring applications; (4) logistics/delivery applications; (5) assisted living applications; (6) health care applications; (7) communication applications; (8) education applications; (9) entertainment applications; (9) industrial applications and/or other relevant uses.

The invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus (e.g., integrated circuits) to perform particular functions. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it is understood that various modifications may be made without departing from the spirit and scope of the invention. For example, some of the steps described above may be order independent, and thus can be performed in an order different from that described. Accordingly, other embodiments are within the scope of the following claims.

What is claimed is:

1. A method of controlling a transferable intelligent control device and a mobile robot, the method comprising:
    in the transferable intelligent control device (TICD), having a first complement of sensors configured to detect an environment and a cross-product communications module,
        recording information regarding locations where the mobile robot is expected to travel and tracking the locations via a localization system of the TICD as the TICD is transported through the environment,
        building maps for the tracked locations within the environment,
        learning a layout and location of rooms within the environment,
        storing the maps, layout and location of rooms within the environment in a memory addressable via the cross-product communications module or a wireless communications module, and
        causing pertinent resources to be transferred, the pertinent resources including the maps, layout and location of rooms within the environment, via the cross-product communications module to the mobile robot having a compatible cross-product communications module; and
    in the mobile robot, having an embedded intelligent control device with a second complement of sensors at least in part different from the first complement of sensors in the transferable intelligent control device,
        using the maps, layout, and location of rooms to drive the mobile robot to navigate through the environment.

2. The method according to claim 1, wherein each of the first complement of sensors and the second complement of sensors includes a camera coupled to a vision recognition system, wherein the vision recognition system recognizes at least one of objects or visual patterns.

3. The method according to claim 2, further comprising:
    in the mobile robot, executing vision recognition to recognize what room the mobile robot is in, then executing navigation control to control the mobile robot to go to a specific location within the environment.

4. The method according to claim 1, wherein the environment is a house, and the mobile robot is a mobile cleaning robot, the method further comprising determining a course to take in navigating from one point to another point based on time, and attempting to complete a specific task.

5. The method according to claim 1, wherein
    the first complement of sensors includes a camera capable of communication with a graphics-enhanced processor, a positioning sensor, and a wireless communications module, and
    the second complement of sensors includes a sensor for detecting obstacles, a sensor for measuring a distance travelled by the mobile robot, and a wireless receiver.

6. The method according to claim 5, wherein the positioning sensor detects signals from devices that are emitting positioning signals.

7. The method according to claim 1, wherein
    the recording is conducted by the TICD as the TICD is held by a person, and the recording comprises:
        recording where the mobile robot is expected to travel and tracking the locations via the TICD localization system as the TICD is walked by the person through the environment.

8. The method according to claim 7, wherein the TICD includes a power source, the method further comprising:
    powering communication with the cross-product communications module.

9. The method of claim 1, wherein the mobile robot comprises a platform, the platform comprising hardware and software compatible with operating TICD software architecture and modules.

10. The method of claim 1, wherein the TICD is a handheld device.

11. The method of claim 1, wherein the TICD comprises sensors for detecting objects and a display screen, the method further comprising showing a representation of detected objects on the TICD display screen in real time.

12. The method of claim 1, wherein recording information regarding locations where the mobile robot is expected to travel is performed while the TICD is not disposed on the mobile robot, wherein the TICD is a handheld device configured to be used to play games using games on the TICD with the use of TICD sensors, a TICD display, and a TICD communication system, and wherein the TICD is configured to detect objects, the method further comprising:
    recording where the mobile robot is expected to travel and tracking the locations via the localization system as the handheld TICD is walked by a person through the environment; and
    showing a representation of detected objects on the TICD display in real time.

13. The method of claim 1, wherein storing the maps, layout and location of rooms within the environment further comprises storing pertinent resources in a global functions and behavior module within the TICD.

14. The method of claim 13, wherein the pertinent resources can be downloaded or transferred from the global function and behavior module in the TICD to another device or TICD.

15. The method according to claim 1, wherein
recording is conducted by the TICD as the TICD is transported through the environment disposed on the mobile robot,
recording where the mobile robot is expected to travel and tracking the locations via its localization system is conducted as the TICD is walked through an environment.

16. The method according to claim 15, further comprising:
in the TICD, connecting via the cross-product communications module to the mobile robot having the compatible cross-product communications module, wherein the TICD assumes control over navigation and movement of the mobile robot.

17. The method according to claim 16, further comprising:
in the TICD, executing commands to cause the mobile robot to explore the environment in which it is located, and while the TICD is operating disposed on the mobile robot, building maps for tracked locations using a combination of information gathered from both the first sensor complement and the second sensor complement.

18. The method according to claim 15, wherein the cross product communications module is a cross-product electrical bus, the method further comprising:
in the TICD, connecting to the mobile robot via the cross-product electrical bus while the TICD is operating disposed on the mobile robot.

19. The method according to claim 15, wherein the cross product communications module is wireless, the method further comprising:
in the TICD, connecting to the mobile robot via the wireless cross-product communications module while the TICD is operating disposed on the mobile robot.

20. The method according to claim 15 mobile robot is a cleaning robot, the method further comprising
directing the mobile robot to utilize systematic or random cleaning patterns as directed by the user and to keep track of areas cleaned.

21. The method according to claim 15, wherein the mobile robot is a cleaning robot, the method further comprising
identifying where dirt or high traffic areas exist.

22. A method comprising:
in a transferable intelligent control device (TICD), having a first complement of sensors,
configured to detect an environment, and a cross-product communications module,
enabling recording of information regarding locations where a mobile robot is expected to travel via a localization system of the TICD as the TICD is transported through the environment,
enabling building of maps for the locations within the environment and enabling learning a layout and location of rooms within the environment,
wherein the maps, layout and location of rooms within the environment are stored in a memory addressable via the cross-product communications module or a wireless communications module, and
enabling the maps, layout and location of rooms within the environment to be wirelessly transferred to the mobile robot; and
enabling the mobile robot, having an embedded intelligent control device with a second complement of sensors at least in part different from the first complement of sensors in the transferable intelligent control device, to use the maps, layout, and location of rooms to drive the mobile robot to navigate through the environment.

23. The method of claim 22, wherein the TICD comprises sensors for detecting objects and a display screen, the method further comprising showing a representation of detected objects on the TICD display screen in real time.

24. The method of claim 22, wherein recording information regarding locations where the mobile robot is expected to travel is performed while the TICD is not disposed on the mobile robot, wherein the TICD is a handheld device configured to be used to play games using games on the TICD with the use of TICD sensors, a TICD display, and a TICD communication system, and wherein the TICD is configured to detect objects, the method further comprising:
recording where the mobile robot is expected to travel and tracking the locations via the localization system as the handheld TICD is walked by a person through the environment; and
showing a representation of detected objects on the TICD display in real time.

* * * * *